US007231363B1

(12) United States Patent
Hughes et al.

(10) Patent No.: US 7,231,363 B1
(45) Date of Patent: Jun. 12, 2007

(54) METHOD AND SYSTEM FOR REBROKERING ORDERS IN A TRADING SYSTEM

(75) Inventors: Webster Hughes, Charlotte, NC (US); Charles Fefferman, Princeton, NJ (US)

(73) Assignee: Wall Corporation, Greenwich, CT (US)

( * ) Notice: Subject to any disclaimer, the term of this patent is extended or adjusted under 35 U.S.C. 154(b) by 770 days.

(21) Appl. No.: 09/706,678

(22) Filed: Nov. 6, 2000

Related U.S. Application Data

(60) Provisional application No. 60/201,599, filed on May 3, 2000, provisional application No. 60/178,049, filed on Jan. 24, 2000, provisional application No. 60/173,581, filed on Dec. 29, 1999.

(51) Int. Cl.
*G06Q 40/00* (2006.01)
(52) U.S. Cl. .............................. 705/37; 705/35; 705/26
(58) Field of Classification Search ................ 705/37, 705/35, 26
See application file for complete search history.

(56) References Cited

U.S. PATENT DOCUMENTS

| | | | | |
|---|---|---|---|---|
| 5,313,560 | A | | 5/1994 | Maruoka et al. ............... 395/54 |
| 5,724,524 | A | | 3/1998 | Hunt et al. .................. 395/237 |
| 5,809,483 | A | | 9/1998 | Broka et al. .................... 705/37 |
| 5,873,071 | A | * | 2/1999 | Ferstenberg et al. .......... 705/37 |
| 5,915,209 | A | * | 6/1999 | Lawrence .................... 340/3.7 |
| 5,987,435 | A | * | 11/1999 | Weiss et al. .................. 705/36 |
| 6,029,146 | A | * | 2/2000 | Hawkins et al. ............... 705/35 |
| 6,067,532 | A | * | 5/2000 | Gebb .......................... 705/37 |
| 6,243,691 | B1 | * | 6/2001 | Fisher et al. .................. 705/37 |
| 6,278,982 | B1 | * | 8/2001 | Korhammer et al. ......... 705/37 |
| 6,499,018 | B1 | * | 12/2002 | Alaia et al. ................... 705/37 |
| 6,594,633 | B1 | * | 7/2003 | Broerman ...................... 705/1 |
| 6,598,028 | B1 | * | 7/2003 | Sullivan et al. ............... 705/35 |
| 2002/0165817 | A1 | * | 11/2002 | Rackson et al. .............. 705/37 |

OTHER PUBLICATIONS

Int'l Search Report, Apr. 12, 2001.
Preliminary Search Report dated Apr. 12, 2001, in PCT/US00/35492.

\* cited by examiner

*Primary Examiner*—Jagdish N Patel
(74) *Attorney, Agent, or Firm*—Kaplan Gilman Gibson & Dernier LLP; Matthew B. Dernier

(57) ABSTRACT

Systems and methods are described herein for supporting the trading of bonds in a computerized system using broker dealers as intermediaries. Broker dealers receive orders relating to particular transactions and have the option to accept the order by submitting a matching counter order, or to rebroker the order with the same or modified terms to a number of other investors or additional broker dealers. The additional broker dealers have similar options, thus providing a system wherein orders can be quickly proliferated to a large number of parties. This order proliferation can be fully or partially automated through the use of predefined rules stored in a database which dictate for each broker dealer whether, to whom and under what terms to rebroker orders. When an order is received, the system processes all such rules to output a set of orders which are then communicated to the corresponding parties.

15 Claims, 21 Drawing Sheets

| Cusip: | 233832AC8 | Issuer | Issue Description | Coupon | Maturity Date |
|---|---|---|---|---|---|

Settlement Date: 6/23/2000 (mm/dd/yyyy)

Initial Order Price ($): 100

Order Type: LiveBid

Displayed Amount: 10

Counter Party: FU

Mark Up: ~350

Choose a Broker Dealer, and then choose the appropriate action.

Available Broker Dealers    Actions    Send Order To ~354

Add    Remove

Lehman Customer 1
Lehman Customer 2
Broker Dealer
Customer 1

METHOD AND SYSTEM FOR REBROKERING ORDERS IN A TRADING SYSTEM

Applicants hereby claim the benefit of the following provisional patent applications, each of which is hereby incorporated by reference into this application in its entirety:

Application No. 60/173,581, titled SYSTEMS AND METHODS FOR DIRECT TRADING AND ANONYMOUS ORDER MATCHING, filed Dec. 29, 1999;

Application No. 60/178,049, titled SYSTEMS AND METHODS FOR DIRECT TRADING AND AUTOMATED BROKERAGE, filed Jan. 24, 2000; and Application No. 60/201,599, titled SYSTEMS AND METHODS FOR DIRECT TRADING AND ANONYMOUS ORDER MATCHING, filed May 3, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to computerized trading methods and systems. More particularly, the present invention relates to computerized trading methods and systems which facilitate enhanced and anonymous trading through the systematic use of broker-dealers.

The use of computerized systems to facilitate commercial transactions has increased drastically over the past few years. Such systems range from private networks for use by subscribers to open systems available over public networks such as the Internet. These systems are being used for many different types of transactions, including the sale and purchase of airline tickets, cars, and homes, auctions and reverse auctions of various merchandise and services, and the trading of securities such as stocks and bonds. In a large number of cases, these systems are designed to eliminate intermediaries, such as agents and brokers, who were traditionally involved in executing these transactions. Indeed, these systems are touted for providing this feature, especially since it thereby eliminates the cost associated with such intermediaries.

However, by eliminating the role of intermediaries, these systems also lose out on the benefits provided by such intermediaries. Agents, brokers, and other intermediaries typically play a critical role in their respective markets. Among other things, they cultivate relationships with clients that lend stability to the overall market and leverage knowledge of the market to help clients achieve the desired results.

This issue becomes pronounced in the market for fixed income securities or bonds. The U.S. fixed income market is the most liquid, largest, and best established in the world, due in no small part to the role of intermediaries such as broker-dealers. Broker-dealers provide liquidity and perform many settlement requirements for each trade, including credit guarantees and storage of dollars. Broker-dealers also perform a key function in the bond markets by shouldering the regulatory burden which, under SEC regulations, requires broker-dealers to register, maintain specific records, and provide various reports on a regular basis. Moreover, broker-dealers have substantial expertise and experience which is brought to bear in the bond trading process. Fixed income securities are highly complex, with 4.4 million different fixed income securities outstanding, each having distinct structures, credit ratings, coupons, maturities, payment schedules, and features.

Certain systems, such as so-called "cross-matching systems," essentially eliminate the use of intermediaries and thereby lose all the benefits provided by broker-dealers. Other existing electronic transaction systems provide a limited role for broker-dealers. For example, certain proprietary systems, sometimes referred to as "dealer systems," allow investors to trade electronically with a specific broker-dealer or group of dealers. However, these systems do not provide investors with electronic access to market participants beyond the specific participating broker-dealers. Also, because each of these proprietary systems is limited to specific participating broker-dealers, they fail to automate interaction between broker-dealers and require investors to use different systems for each broker-dealer.

Other systems, such as so-called "inter-dealer systems," allow broker-dealers to trade with one another only. However, these systems do not allow interaction with investors, the ultimate buyers and sellers of the securities. Clearly, a need exists for a comprehensive and effective trading system which allows intermediaries to participate and provide the benefits of their participation.

In addition, the inventors recognize a need and opportunity to improve the traditional role of broker-dealers through the use of an improved computerized trading system. Currently, fixed income transactions between broker-dealers and their customers are executed through multiple voice exchanges of information. An institutional fixed income investor will typically relay a verbal order to a salesperson at a broker-dealer. The salesperson will then verbally relay the customer's order to a trader at the broker-dealer who makes markets in that particular security. Negotiations, information requests, and eventual execution of the transaction are all done either verbally or, more recently, through electronic messaging.

While a simple execution in a liquid security, such as a treasury security, may take less than a minute from the initial call placed by the investor to the consummation of the trade, an execution in a less liquid bond can take days if the broker-dealer is bidding a bond that it wishes to own, or offering a bond that it currently owns. Likewise, transactions can take considerable time to consummate if the broker dealer needs to find a buyer of the bond that the client wishes to sell or if the broker dealer must find somebody who owns the bond and is willing to sell it. Traders and salespeople at broker dealers have to prioritize their time and attention to make sure that the most valuable trades get done. A single salesperson will have many accounts to cover, but can only conduct one transaction at a time, thus many potential buyers do not even learn about bonds that a particular broker dealer may have for sale.

There is thus a need for improved computerized trading methods and systems which facilitate the role of broker-dealers in trades and take better advantage of the benefits which can be provided by broker-dealers and other intermediaries.

BRIEF SUMMARY OF THE INVENTION

It is an object of the present invention to solve the problems outlined above in existing trading systems.

It is another object of the present invention to enhance the roles of broker-dealers in securities trading systems.

It is another object of the present invention to support anonymous trading between investors through broker-dealers in a computerized trading system.

It is another object of the present invention to proliferate orders in a trading system as quickly and completely as desired by the parties involved to thereby increase the chances of achieving a desired trade.

It is another object of the present invention to facilitate trading of securities through automated rebrokering of orders by broker-dealers.

Some of the above and other objects are achieved by a method and system for executing a transaction in a computerized system, the transaction based upon an order communicated by a first ordering party. The method includes allowing each of a plurality of parties receiving an order related to the transaction to designate a plurality of other parties with whom to communicate orders relating to the transaction and to communicate orders with such designated other parties using the system. In certain contexts, such communication of further orders is sometimes referred to herein as rebrokering. Following placement of various orders, the system determines whether a match occurs on the order communicated by the first ordering party and on an order communicated by a second ordering party, and executes the transaction relating to the matched orders at least by executing orders communicated by the first and second ordering parties.

The methods and system may advantageously be used for trading and order matching of financial instruments, such as fixed income securities, also referred to as bonds, or currencies and foreign exchanges, as well as many other electronic commerce systems which involve the buying, selling or auctioning of commodities or services. Participants in these systems include buyers who submit orders to purchase goods or services, sellers who submit orders to sell goods or services, and intermediaries such as broker-dealers or agents. In the case of securities, the orders constitute offers to sell securities and bids to purchase them. In accordance with an advantageous feature of embodiments of the present invention as explained further herein, participants may serve in several such roles in any given transaction. For example, a broker-dealer may serve as an intermediary by passing along an order relating to a transaction or as a buyer or seller by opting instead to submit an appropriate matching or counteroffer order.

In some embodiments, the first ordering party can communicate orders with a plurality of parties, only one of which is selected for execution of the transaction. That is, the selected party is the one who submits a matching order or acts as an intermediary to submit a further order which is matched or precipitates further orders one of which ultimately matches the original order. In embodiments for the trading of bonds, a broker dealer receiving an order from an investor to buy or sell bonds checks whether it has received a matching order from another investor or broker dealer and, if not, proceeds to rebroker the order according to instructions from the investor, stored rules, or both. The multiple orders submitted by the first ordering party may either have the same or different sets of terms, such as price, amount, allowable counterparties, acceptable variances in terms, etc.

Orders may also be of several different types, including live or subject. If the first ordering party sets an order as live, subsequent parties submitting orders relating to the transaction may also submit live orders. When a match occurs between live orders, the system automatically executes the transaction including the orders submitted by the first ordering party, by the second ordering party which submitted the matching live order, and by any parties in between the first and second parties. When an order is made subject by the first ordering party, the system determines whether a condition is satisfied to which the order is subject before executing the transaction. An exemplary condition is approval of the first ordering party.

In some embodiments, each party using the system is associated with or has access to a list of other parties with whom the party can communicate orders. This list may be generated by the party itself, or may be generated by the system using a set of rules and information such as the identity and any restrictions placed by the first ordering party. The list may be displayed to the party in relation to a specific transaction, and the party can select one or more parties from the list with whom to communicate an order. The terms of the order which the party can communicate, such as the price, may be limited by the set of rules or restrictions set by the company or group to which the party belongs.

Various aspects of embodiments of the present invention may be illustrated through the following exemplary scenarios in which parties are designated by letters for simplicity. In a first example, a first ordering party A submits an order for a transaction, such as an offer to sell bonds at a set price, to party X. X may be a broker-dealer. X designates one or more other parties $Y_1, Y_2, \ldots Y_n$, to whom to communicate an order relating to the bonds. For each party Y, the order may be at the set price or at a markup. Of the parties Y receiving the order from X, some may be serving as intermediaries who are allowed to rebroker their orders and others may be serving as end parties who can only accept the order by submitting a matching order or submit a counteroffer.

Eventually, some party B submits an order which is determined to match the order it received from one of the intermediaries. For the sake of clarity, party B could be: party X submitting an order matching the one received from A; one of the parties Y submitting an order matching the order received from X; another counterparty who received an order from one of the parties Y; or another party who can submit orders to broker dealer X. In any event, the system executes the transaction by executing all orders between A and B. For example, if B received an order from a party $Y_1$, the system executes the orders between B and $Y_1$, between $Y_1$ and X, and between X and A. As a result, the transaction is executed between A and B, e.g., bonds are sold indirectly from A to B, without A and B knowing one another. Indeed, A is only aware of the execution of its transaction with X and B is only aware of the execution of its transaction with $Y_1$.

In a further example, A may submit multiple orders to multiple parties $X_1, X_2, \ldots X_n$, who may each submit further, possibly altered orders to a number of other parties Y. To the extent any given party Y receives orders relating to the transaction from multiple parties X, the party Y may choose the order having the most favorable financial terms, e.g., the best price or least restrictions, or, for identical orders, either of such orders. Some or all of parties Y may further serve as intermediaries by submitting orders to parties Z, and so on. As can be seen, the number of parties receiving and submitting orders in this fashion relating to the transaction can quickly and exponentially proliferate, thus drastically increasing the chances of a quick, successful match.

In accordance with an advantageous feature of embodiments of the present invention, the communication or rebrokering of orders by intermediaries is performed on a fully or semi-automated basis in accordance with sets of rules determined by the parties. That is, each intermediary may have an associated stored set of rules which govern, according to a set of conditions, whether to rebroker any given order, to whom such order should be rebrokered, and the terms of such rebrokered orders. When an order is placed, the system processes the various rules of all affected parties to determine the orders presented to all parties following all rebrokerage arrangements.

Using the illustrative examples given above, if A submits an order to party X, X's set of stored rules and any restrictions placed in the order by A, such as counterparties to whom further orders may be placed, are processed by the system. X may have rules providing that it will rebroker all orders to party $Y_1$ at a first price markup, will rebroker all orders to party $Y_2$ at a second, higher price markup, will not rebroker orders received from party A to party $Y_3$, and will rebroker orders to party $Y_4$ with a restriction on counterparties to whom $Y_4$ may rebroker the order. The system processes the rules to generate a set of orders from X. Rather than immediately communicating these orders, the system determines what each of the parties Y receiving the orders may do, in part based on their rules, and generates a set of orders based on those rules. This process continues until all orders are generated or the number of parties in the chain reaches predefined limits. The generated orders are then communicated to the identified parties, who can act on them accordingly.

In some embodiments of the invention, the first ordering party specifies an amount of items he wants to trade and may further specify how much variance in the amount is acceptable for a matching order. In addition, the ordering party may specify an additional amount of items which are available for trading and which should be associated with the order but kept hidden from other parties. The system uses this information in determining whether a match is found and for how many items. For example, if the ordering party specifies 100 items in the order with an allowable variance of 25 and a hidden inventory amount of 50, the system can match the order with orders ranging in amount from 75 to 150.

Some of the above and other objects of the present invention are also achieved by a method and system for facilitating execution of a transaction in a computerized system, the transaction being based upon an order communicated by a first ordering party. The method includes allowing each of a plurality of parties using the system and receiving an order relating to the transaction to communicate orders relating to the transaction with a plurality of other parties using the system, determining whether a match occurs on the order communicated by the first ordering party and an order communicated by a second ordering party, and identifying a chain of parties between the first and second ordering parties who have communicated orders relating to the matched orders. In accordance with the present invention, the identities of the parties in the chain are not solely determined by parameters set by the first and second ordering parties. Further, the transaction may be executed by executing orders communicated by the parties in the chain.

Using the illustrative examples established above, a party A submits orders to multiple parties X which can each submit rebrokered orders to one or more parties Y. One such party, $Y_4$, receives two orders relating to the transaction from parties $X_1$ and $X_5$, selects one of such orders, e.g., the order from $X_1$ as the order having the more favorable terms, and submits a rebrokered order to party B. If party B accepts the order or submits a matching order, the method and system identifies the chain of parties involved in the transaction. In this example, the chain identified by the system includes party B, party $Y_4$, party $X_1$, and party A. Alternatively, the system tracks with the order the parties in the chain of the order as the order is passed along, e.g., in this case, the order received by B contains a path stored with the order (although preferably not visible to party B) listing $Y_4$, $X_1$, and A. In either case, the identification of parties $X_1$ and $Y_4$ is not solely as determined by parameters set by A and B, in that their selection is partly due to decisions made by these intermediaries themselves as to whom to communicate orders with and under what terms. If additional intermediaries were involved between parties X and Y, the identification of these additional intermediaries would also be at least partly independent of decisions made by end parties A and B.

Some of the above and other objects are also achieved by a method and system for facilitating execution of a transaction between a first party and a second party through a plurality of intermediaries. The method includes, for each intermediary involved in the transaction, presenting to the intermediary an order received by the intermediary relating to the transaction. A list of other parties is stored in a memory accessible to the intermediary, and the list is displayed to the intermediary. The intermediary is allowed to select one or more parties from the list to which the intermediary can communicate an order relating to the transaction, and the order from the intermediary is communicated to the one or more selected parties. As with the embodiments described above, the intermediary party may communicate orders with different terms to different parties from the list, and may define in the order whether each such other party may rebroker the order or only accept the order.

In a further aspect of the present invention, a method is described for facilitating execution of a transaction based upon an order communicated by a first ordering party, the method including presenting to a second party an order received by the second party relating to the transaction, and allowing the second party to decide whether to match the presented order or communicate an order relating to the transaction to one or more other parties. If the second party decides to match the presented order, the transaction is executed by at least executing the presented order and the order communicated by the first party. If the second party decides to communicate the order, the order is communicated to the one or more other parties.

In a further aspect of the present invention, a method includes: receiving a first order from a first ordering party, the first order including at least one bid or offer relating to an item to permit execution of a serial chain of transactions in a computerized system based on the first order; receiving one or more intermediate orders, including at least one offer or bid relating to said item, from at least one of a plurality of intermediate parties using the computerized system, at least one of the intermediate orders being placed by the at least one intermediate party in response to the first order; receiving a second order, including at least one offer or bid relating to said item, from a second ordering party using the computerized system, the second order being placed by the second ordering party in response to one or more of the intermediate orders; identifying the serial chain of transactions using the first order, at least one received intermediate order, and the second order; and executing at least one transaction within the serial chain of transactions (or executing the serial chain of transactions), where the serial chain of transactions comprises a transfer of said item between the first ordering party and a first intermediate party, and a transfer of said item between the second ordering party and a last intermediate party. The first and last intermediate party may be the same intermediate party (i.e., one intermediate party between the first and second ordering parties) or they may be different intermediate parties (i.e., more than one intermediate party between the first and second ordering parties).

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 9–18 are exemplary screen displays used in one implementation of the present invention to display and collect information and actions by users of the system of FIG. 1.

DETAILED DESCRIPTION OF THE PREFERRED EMBODIMENTS

Embodiments of the present invention are now described with reference to the drawings in the Figures. The primary embodiments described below include a computerized trading system for the trading of bonds among parties using broker dealers as intermediaries. The system contains software and data structures which, among other things, support anonymous trading through broker dealers, allow parties to have a high degree of control over the trading process, and substantially automate the trading process. As will be recognized, the system may alternatively be used for the trading of many other types of products or services in a computerized environment.

Figure 1:
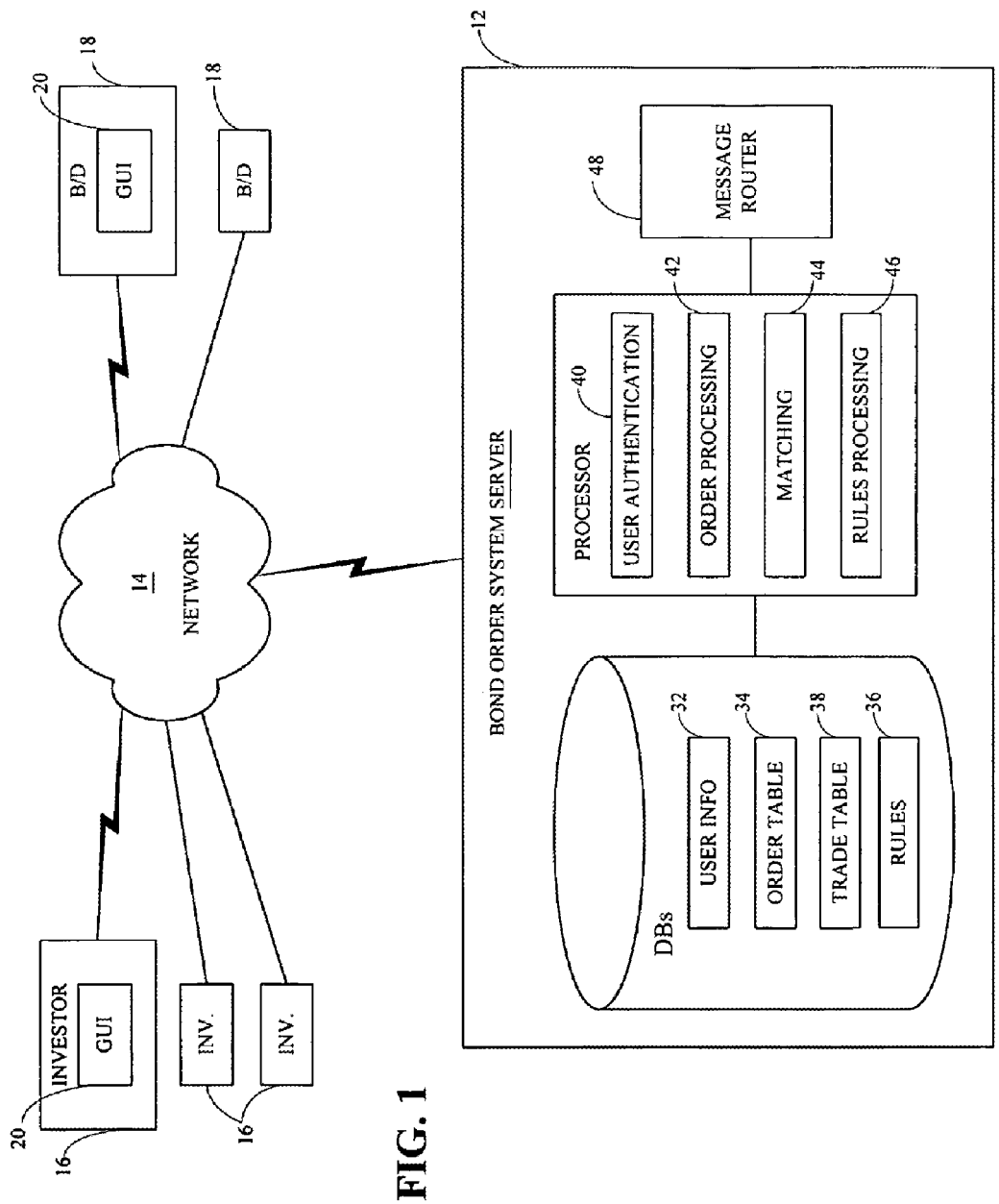
FIG. 1 is block diagram showing a trading system in accordance with one embodiment of the present invention.

With reference to FIG. 1, one preferred embodiment of the bond trading system 10 of the present invention contains an order processing server 12 connected directly or over a telecommunication link 14 such as the Internet to a number of investor client computers 16 and broker dealer client computers 18. Investors utilize the investor client computers 16 to place orders such as bids or offers to other parties using the order processing system 12 through a graphical user interface 20. Similarly, broker dealers use broker dealer computers 18 running the program generating the graphical user interface 20 to receive orders from investors through the order processing system 12 and rebroker the orders to counterparties or other broker dealers.

The order processing server 12 is a computerized device having a processor 22, a number of volatile and nonvolatile memory devices 24, input/output devices 26, and a communication interface 28 for receiving and transmitting messages over the telecommunication link 14. In accordance with the invention, the order processing server 12 has a database management program 30 which manages one or more databases stored in the memory devices 24 for storing data used in order processing. The databases include: user information files 32 storing registration and authentication data; order files 34 storing detail and status data regarding orders placed on the system 10; rule files 36 storing rebrokerage rules used in determining whether and how to rebroker orders for each broker dealer; and trade files 38 storing information regarding matched orders that have been executed as trades. These data structures are described in greater detail below.

The order processing server 12 also contains a number of software programs or routines for performing various functions needed to process orders. These routines include: a user authentication routine 40 for providing access to the system to users based on data in the user information files 32; an order processing routine 42 for receiving orders from users and updating the data in the order files 34; an order matching routine 44 for determining when two orders entered on the system are matching and should be executed and entered in the trades file 38; a rules processing routine 46 for processing the stored rules 36 in the context of specific orders and determining what additional orders should be generated as a result; and a message router 48 for routing messages among the users of the system. The operation of these software routines is described in greater detail below.

In some embodiments, the database management system is an object oriented relational database system which is implemented utilizing commercially available software and uses standard query language. Database software is commercially available from Oracle, Microsoft and others. The processor in the order processing server 12 comprises the central processing unit of a computer, e.g. an Intel, Motorola, or AMD microprocessor. The message router 48 may be implemented utilizing software or hardware, and commercially available software for routing messages includes software from Microsoft, Oracle and others.

The system of the present invention may be implemented as a "virtual" system, for example as a site on a computer network such as the world wide web, a corporate intranet, a government/military network, or the like. For ease of access to the widest number of participants, the virtual community is implemented in one embodiment as a world wide web site. Currently available hardware platforms, including PC's, Minicomputers and mainframes, and currently available operating systems, including UNIX, MS Windows, Mac OS and Linux, may be utilized to host the site.

In embodiments in which the system is implemented to operate over the Internet using web protocols, messages to and from users are in Extensible Markup Language (XML) format. Users run web browsers on their client computers 16, 18 and download the graphical user interface components as XML markup pages from the server 12. Users then transmit order data and request services via XML messages, and responses are likewise provided via XML messages. All messages to and from the processor may also be encrypted using SSL. These messages can thus be sent and received from any XML compatible platform. A programmatic API (application program interface) may be provided to facilitate the formulation of XML message requests and the handling of XML message responses. The API is used to communicate with the order processing site 12. The structure and use of the XML format for messages in the present system are described in greater detail below, and exemplary XML message formats for various functions supported by the bond order system are contained in an Appendix attached hereto and forming part hereof.

Figure 2A:
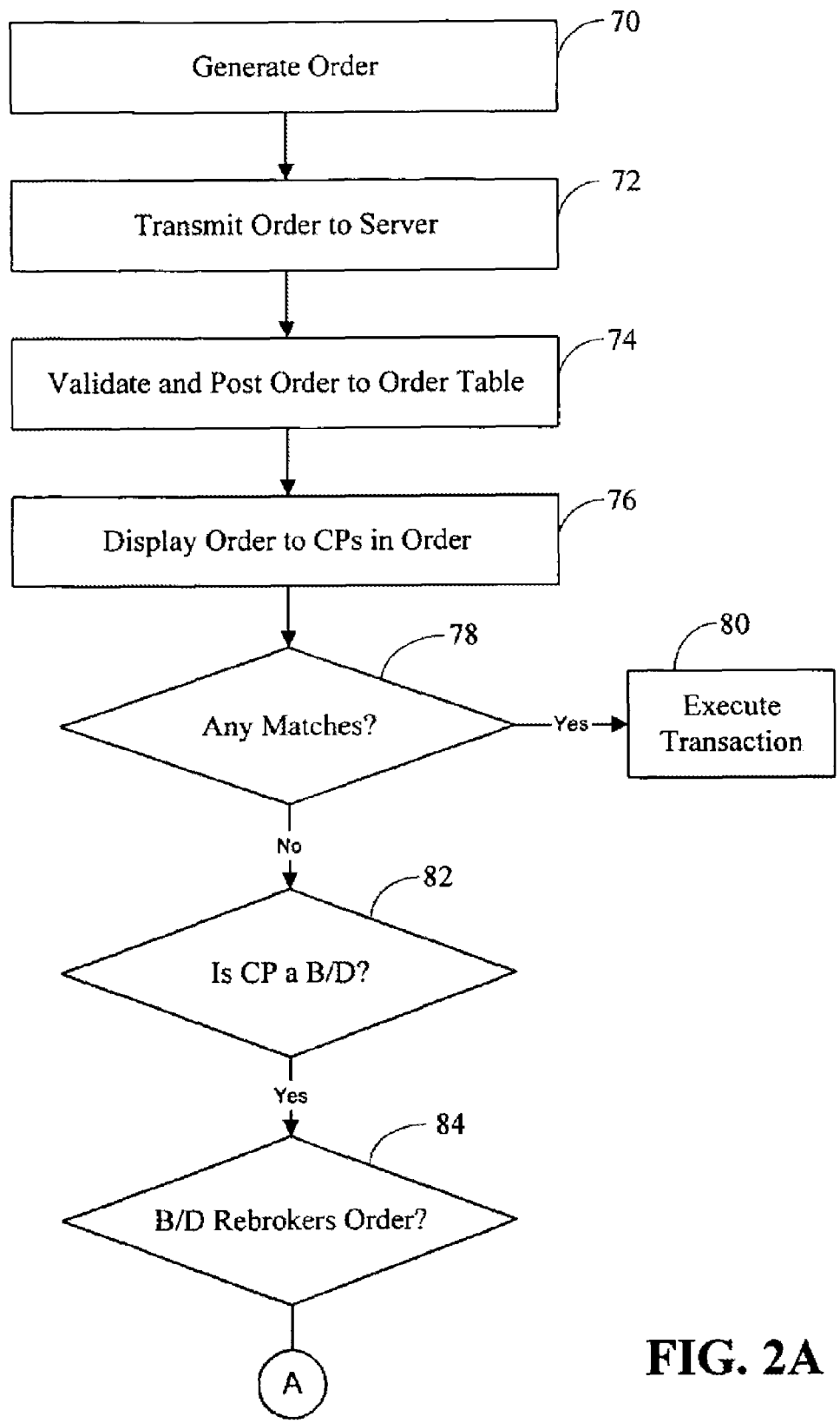
FIGS. 2A–2B contain a flow chart showing a process of generating orders through broker dealers using the system of FIG. 1 in accordance with one embodiment of the present invention.
Figure 2B:
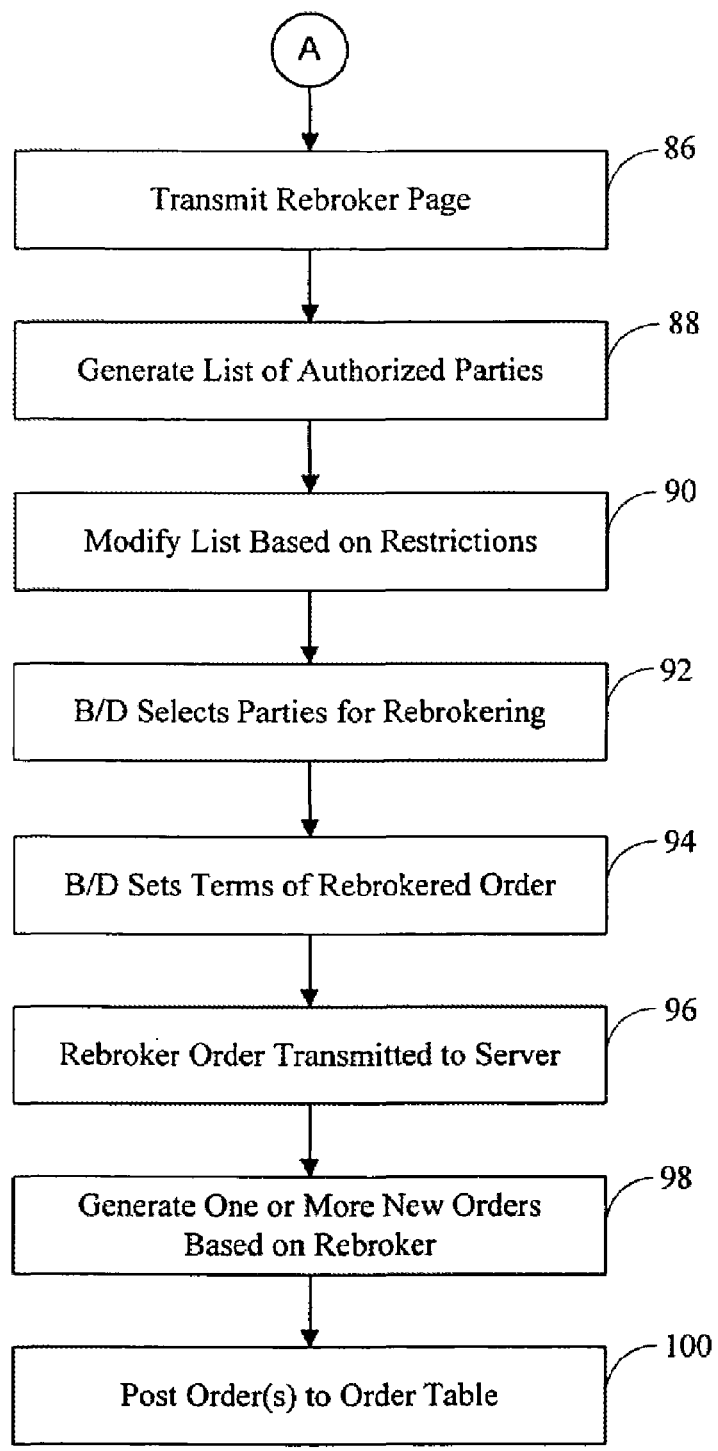

Referring now to FIGS. 2A–2B, one generalized process for generating orders using the trading system of FIG. 1 begins when an investor generates an order, step 70. As explained further below, the investor generates the order by completing information requested in an XML page downloaded from the order processing server 12. The order information includes: the identity of the bond being traded, e.g., the CUSIP; the terms of the order including pricing information, whether the order is live or subject, minimum and maximum price amounts which would be accepted for a match, a tail, whether the order can be partially matched and whether the system should generate a new order with any remainder; authorized counterparties who may or should receive the order; and authorized broker dealers and any restrictions on the ability of the broker dealers to submit orders of their own or rebroker the order to others. The order is transmitted over the Internet to the server, step 72, which validates the order and posts it to the order file, step 74. The order is now available for viewing by all authorized counterparties and broker dealers.

When an authorized counterparty or broker dealer accesses order data from the server, the new order is transmitted from the server and displayed in the list of orders for that party, step 76. These recipients may then, among other things, submit orders relating to this transaction in similar fashion. This includes broker dealers, unless the investor has limited in the original order the ability of the broker dealer to submit orders. The order matching routine regularly polls pending orders, searches for matching orders, step 78, and executes the transaction if matching orders are found, step 80.

If a party receiving the order via the order files is a broker dealer authorized by the investor to rebroker the order, step 82, the broker dealer is presented on the order listing with the option to rebroker the order. If the broker dealer decides to rebroker the order, step 84, an XML web page is downloaded to the broker dealer computer from the server and presented to the broker dealer, step 86. The server also generates a list of parties to which the broker dealer may rebroker the order by retrieving the identities of parties with which the broker dealer is authorized to transact business stored in the user information files, step 88, and modifying the list in accordance with any restrictions placed by the investor in the order, step 90. The list of authorized parties is supplied in advance by the broker dealer when registering with the bond trading system, and may vary depending upon the particular employee within the broker dealer who is accessing the system.

The broker dealer receives the rebroker page and list of available rebrokerage target parties and completes information requested in the page, including a selection of counterparties from the list to which the order is rebrokered, step 92, and the terms of the rebrokered order, step 94. The terms may include a change in price of the order due to a markup imposed by the broker dealer. The completed information is transmitted to the server, step 96, which generates one or more orders based on the completed information, step 98. The generated orders are posted to the order file, step 100.

The process then continues when the recipients of the brokered orders download updated order information from the order file.

As can be seen, this process allows an order to be brokered and rebrokered to any number of parties and counterparties. When an order is matched, either between a party and a counterparty, which may be a broker dealer, or between a broker dealer and a counterparty, the order processing system identifies the chain of parties having matched orders by processing the orders file to follow each order in the transaction relating to the identified bond back up to the original investor submitting the first order. The individual orders between each party are each executed as separate portions of the overall transaction.

The process of proliferating orders in the system as set forth in FIGS. 2A–2B is performed without the use of the rules file and rules processing software component. An alternative for proliferating orders in a highly automated process using these components is set forth in FIGS. 3A–3B. As before, the process begins with an investor generating an order and transmitting it to the server, step 110. The server posts the order in the order file, step 112. The rules processing software running on the server then parses the order to retrieve the list of counterparties in the order, step 114. For each counterparty, the rules processor determines if the party is a broker dealer and is authorized in the order to rebroker the order, step 116. If the party is not authorized to rebroker, the order is simply posted in the order file as a straight order, step 118.

If the party is authorized to rebroker, the rules processor determines whether the party has already received another order from a different source relating to this transaction, step 120. Such a prior order could have been received if the order under consideration is not directly from the investor but from another intermediary party. If such an order was received, the software determines whether the terms of the prior order, e.g., the price, are better than the terms of the current order, step 122. If so, the current order is ignored, step 124, on the theory that the broker dealer would always prefer to deal with the more favorable order as between conflicting orders for the same trade.

The rules processor retrieves the broker dealer's rules from the rules file, step 126. The specific nature of the rules which may be set by broker dealers is described in greater detail below. Among other things, the rules can set trading limits for a given broker dealer or employee within a broker dealer's organization and can specify customers or investors whose orders can be rebrokered or to which orders can be rebrokered. The rules processor thus checks based on the rules whether the broker dealer's trading limits have been reached, step 128. If the limits have been reached, the broker dealer is informed that it cannot engage in trading over this order, step 130, and the order is ignored, step 124.

If the trading limits have not been reached, the rules processor determines from the rules whether the broker dealer is allowed to rebroker orders received from the investor or other customer (which may be another broker dealer), step 132. If no rebrokering is permitted, the order is posted to the order file for this broker dealer with a notation, that rebrokering is not available, step 134. If rebrokering is permitted, the rules processor iterates over the list of counterparties contained in the broker dealer's stored list, step 136, and determines for each whether the counterparty is a permissible trading partner with the investor or customer which generated the order under consideration, step 138.

This determination is made based on the customer's stored rules, the counterparties' stored rules, and/or any restrictions imposed in the order itself.

For each counterparty to whom rebrokering is permitted, an order is generated by the order processing server, step 140. The order contains the terms from the order received by the broker-dealer, e.g., the identity of the bond(s) in question and whether the order is live or subject, modified in accordance with any rules from the broker dealer's rule file. These modifications include, for example, a markup on the price in the order associated in the rules file with the respective counterparty. When all such counterparties have been considered for the broker dealer, step 142, the system returns to consider the next pending order in similar fashion. When all such orders have been processed in this fashion, step 144, the generated orders are posted to the order file, step 146, so that they are accessible to the users of the system.

Figure 3A:
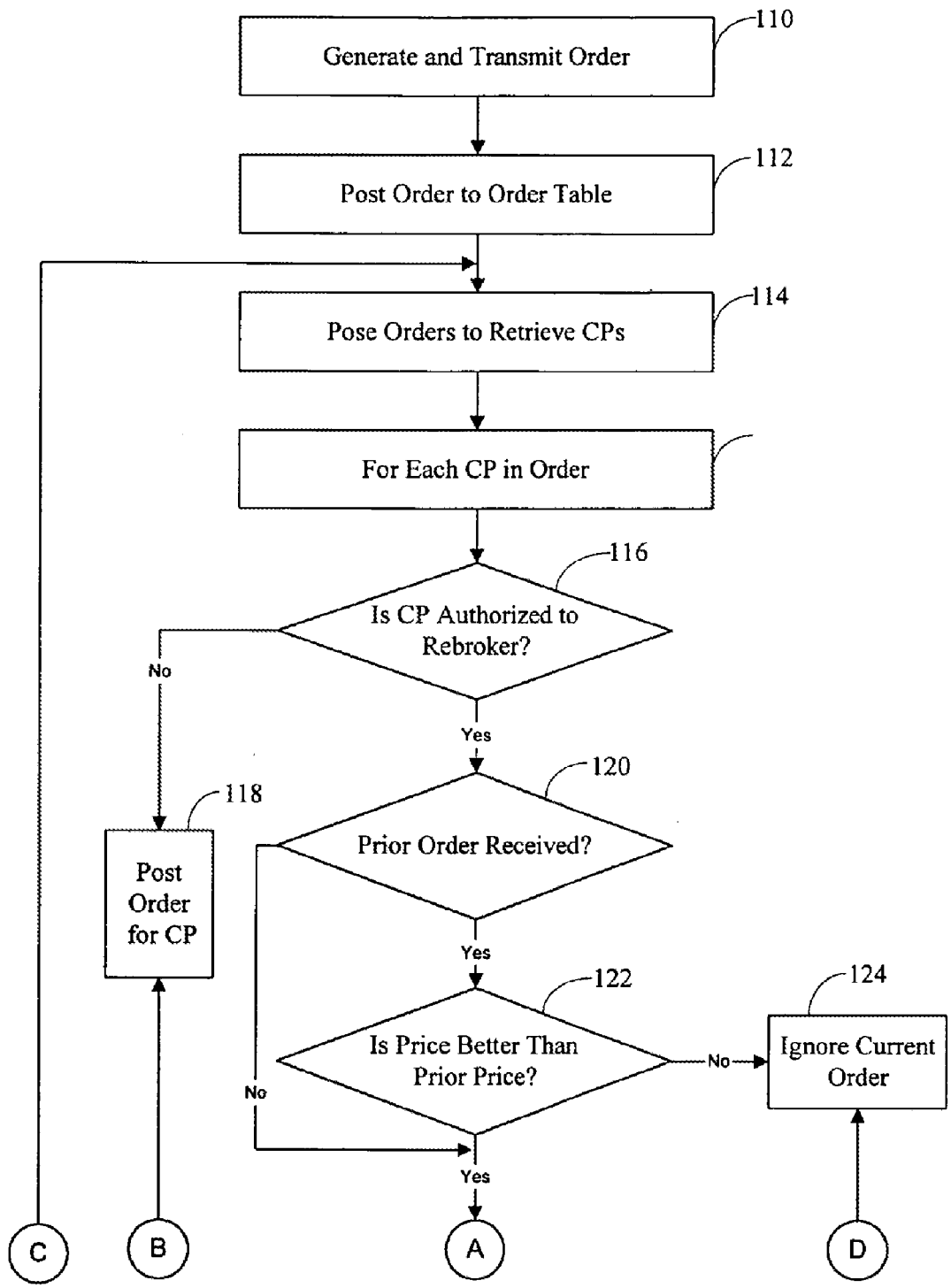
FIGS. 3A–3B contain a flow chart showing an alternative process of generating orders using stored rules in accordance with one embodiment of the present invention.
Figure 3B:
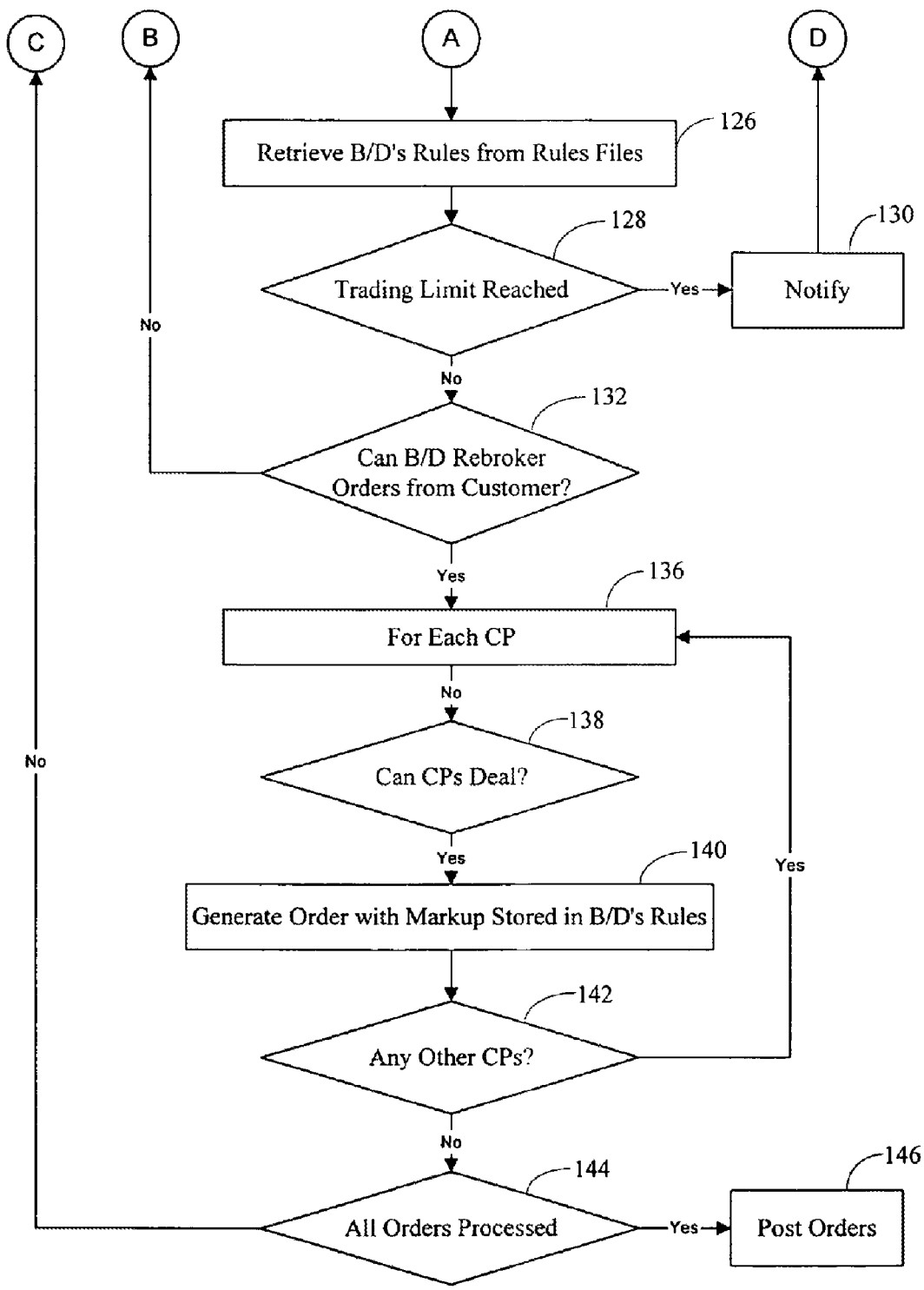

As can be seen, using this process the order processing server has preprocessed all orders in accordance with the rules to generate a set of resulting orders which are then communicated to the parties. The parties receiving these orders can then submit counter orders, from which the order matching software will locate any matches, in accordance with a process described more fully below. Because the process described with reference to FIGS. 3A–3B is automated, a risk exists that a combinatorial explosion could occur while the system is proliferating orders. To prevent this, the order processing server imposes a braking mechanism on the iterations that stops further proliferation of orders. In one embodiment, the server tracks the number of parties in a chain of orders starting with the investor submitting the initial order through the various broker dealers who received the order. This tracking may be performed by appending each step in the pathway taken by an order to the order data entry. The system then ignores any orders once a threshold number of parties in the pathway or chain has been reached, e.g., three. The server would then terminate the order at that broker dealer and not allow any further rebrokering. Other braking mechanisms may be used as would be understood by one skilled in the art depending upon the expected trading volume in the system and the extent of automation in the process.

Figure 4:
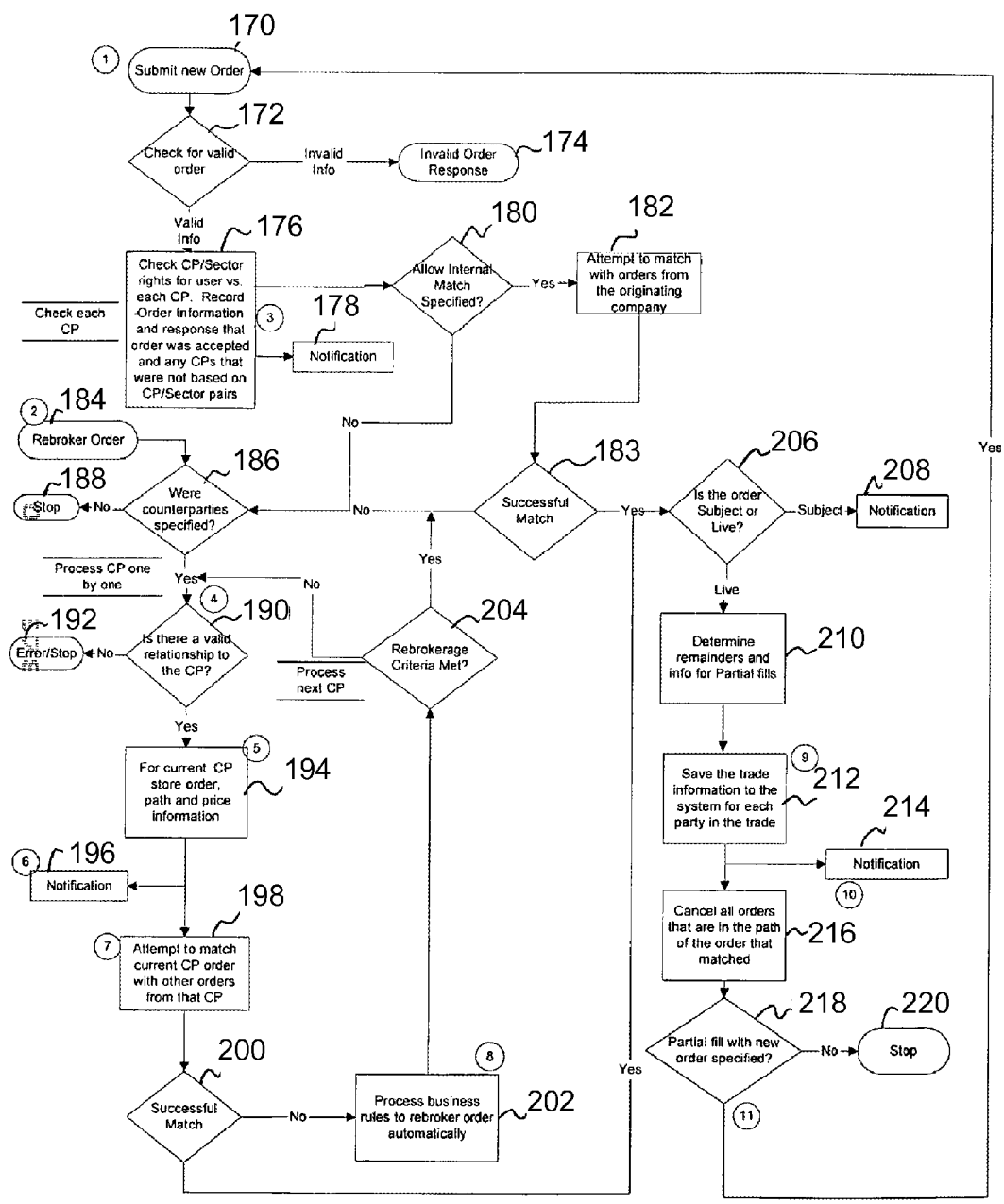
FIG. 4 is a flow chart showing the processing of orders in accordance with another embodiment of the present invention.

FIGS. 2A–2B and 3A–3B set forth substantially non-automated and substantially automated processes, respectively, for generating orders through rebrokering. FIG. 4 shows the processing of orders in a further embodiment of the system. The process shown in FIG. 4 provides for broker dealers to check for matches on existing orders it received before implementing the stored rules for automated rebrokering of a new order, including matches on orders placed by the broker dealers themselves. Referring to FIG. 4, the process begins as before with a new order submitted to a broker dealer, step 170, which is checked for validity, step 172. The order includes various information as described further herein, including a list of counterparties to which the order initiator wants to have the order sent and whether the order may be matched internally by another order originated from the same company as the current order. If the order is invalid, a message to that effect is provided to the submitter, step 174. The system also checks whether the user sending the order has rights to send the order to each counterparty specified in the order, based for example on a check of the counterparties against the sector of the order, and stores the order details for a valid order and for acceptable counterparties in the order file, step 176. The party creating the order is notified that it has been successfully entered on the system and whether it does not have rights to send the order to any of the specified parties, step 178.

If the order specified that matches on internal orders were permitted, step 180, the system attempts to match the current order with orders from the same company as the current order, step 182. The logic for finding matching orders is described in greater detail below with reference to FIG. 8.

The existing order may be an order which has been rebrokered by a broker dealer with a markup to others in the system, step 184. If no counterparties are specified in the original or rebrokered order, or any listed counterparties were eliminated in the sector check described above, step 186, the order is not rebrokered and the process stops, step 188. For each counterparty specified in the original or rebrokered order, the order processing server determines whether the broker dealer has a relationship with the counterparty, step 190, and is thus permitted to trade with the counterparty. This determination is made based on the broker dealer's user information stored in the system. If not, no order is generated for this counterparty, step 192, and the system proceeds to consider the next counterparty in the order.

If trading is permitted, the server stores the order for the counterparty and captures the path that the order takes across each rebrokerage and applies the markup indicated by the broker dealer to determine and store the price, step 194. The counterparty is notified that the order has been brokered to him, step 196. This notification occurs when the counterparty accesses the order file as described above or through a messaging system.

The system attempts to match the order with other orders in the system received from the counterparty or submitted by the broker dealer itself, step 198. The process for finding a match is described in greater detail below with reference to FIG. 8. If no match is found, step 200, the rules set by the broker dealer receiving the order are accessed to determine whether and how the order may be rebrokered automatically, step 202, as explained above. If the criteria for rebrokering the order are met, the system creates a rebrokered order or orders in accordance with the rules, including the predefined markup for each potential counterparty, step 202. The order is then processed in accordance with the procedure for other orders, as just described.

In this embodiment, then, the rules for rebrokerage are checked, and automated rebrokering occurs, when no matches are found in pending orders for a given broker dealer though manual entry of orders or rebrokered orders. In another embodiment, the system waits a preset period of time for counterparties to receive the notification of the order and submit orders which may match the orders, or for the broker dealer to submit such a counterorder. Following this period, the system rechecks for matches and implements the business rules for rebrokerage if matching orders are still not found.

If an internal match is found, step 183, or a counterparty or broker dealer order match is found, step 200, the system checks whether the order has been set (by the original ordering party) as subject or live, step 206. If set as subject, the system notifies the counterparties, including the original ordering party and the counterparty (either an investor or broker dealer) who submitted the matching order that a match has occurred and if the orders were changed to live the trade would occur, step 208. If the parties proceed to change the order to live, or if the order was originally set as live or to change into a live order after a given period of time, the system continues to process the transaction by determining whether the matched orders are for the same number of items or for a partial fill of the original order, step 210. Handling of partial fills, remainders, and tails are described more fully below.

The system creates the trade and updates all the orders relating to the transaction to indicate that they have been traded as well as the information for each party in the chain involved in the trade, step 212. This is accomplished through use of the path information stored with the order to identify the chain of parties involved in the transaction. A notification of the trade is sent to the parties involved in the trade, step 214. The system further cancels all orders that are in the path of the order that matched, step 216. With this done, the system can also cancel all orders which branched off the cancelled orders, thus revising the order table to reflect that those resulting orders are now inactive.

If the matched orders resulted in a partial fill and the original ordering party specified that a new order should be generated from the remainder or unfilled portion, step 218, the system generates such new order and submits it as a new order, step 170. Otherwise, processing for this transaction is stopped, step 220. As a result, a transaction relating to the original order has been executed, and the parties involved in each stage of the transaction can then proceed to arrange for settlement and payment. Embodiments of the trading system of the present invention are designed to interface with existing settlement and payment systems, such as the Thomson Financial system or the OASIS system using the SWIFT protocol, through the use of an application programming interface which facilitates integration of the systems.

Figure 5:
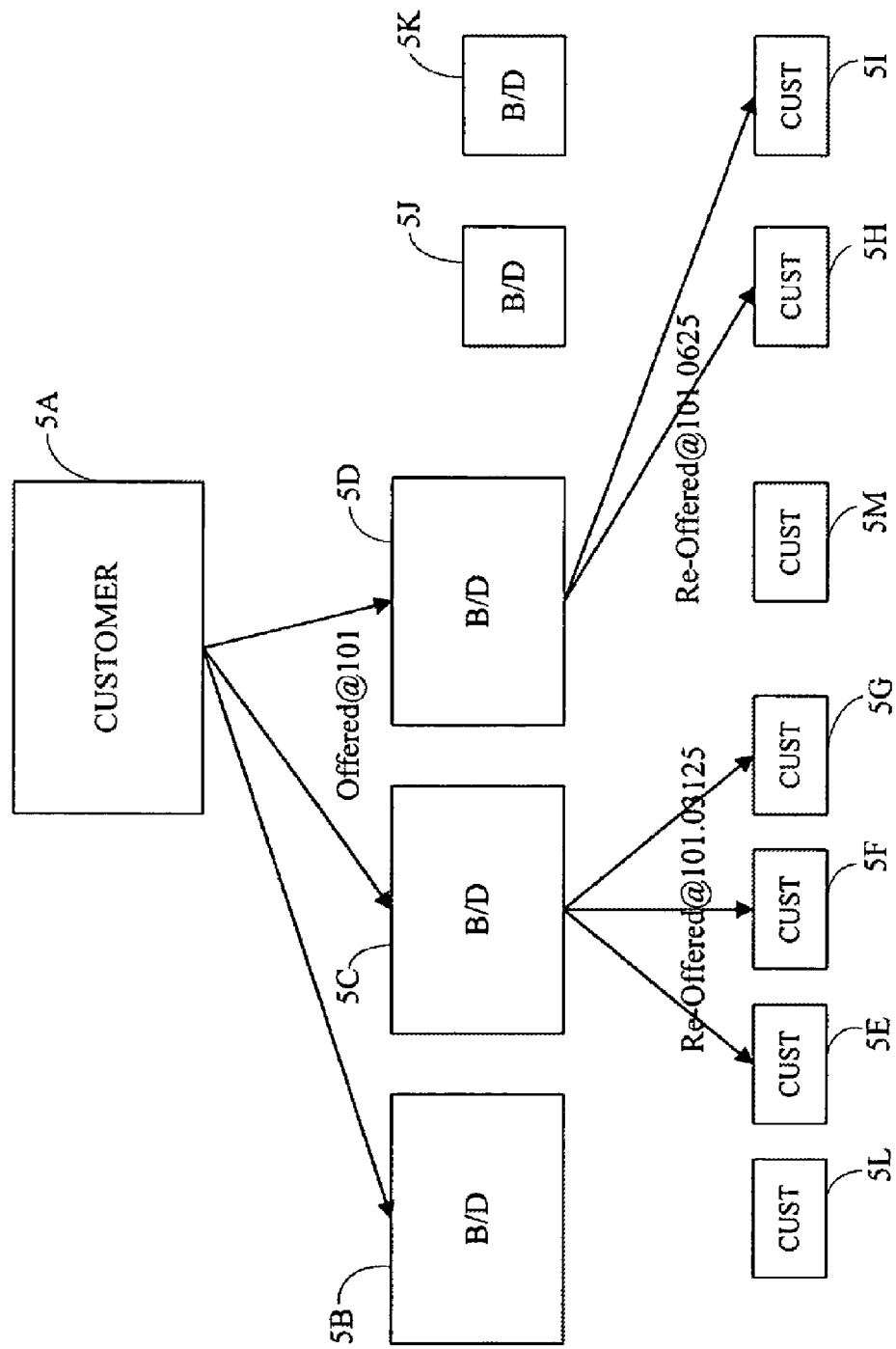
FIGS. 5–7 are flow diagrams showing exemplary trading scenarios involving broker dealers using the system and methods of FIGS. 1–4.
Figure 6:
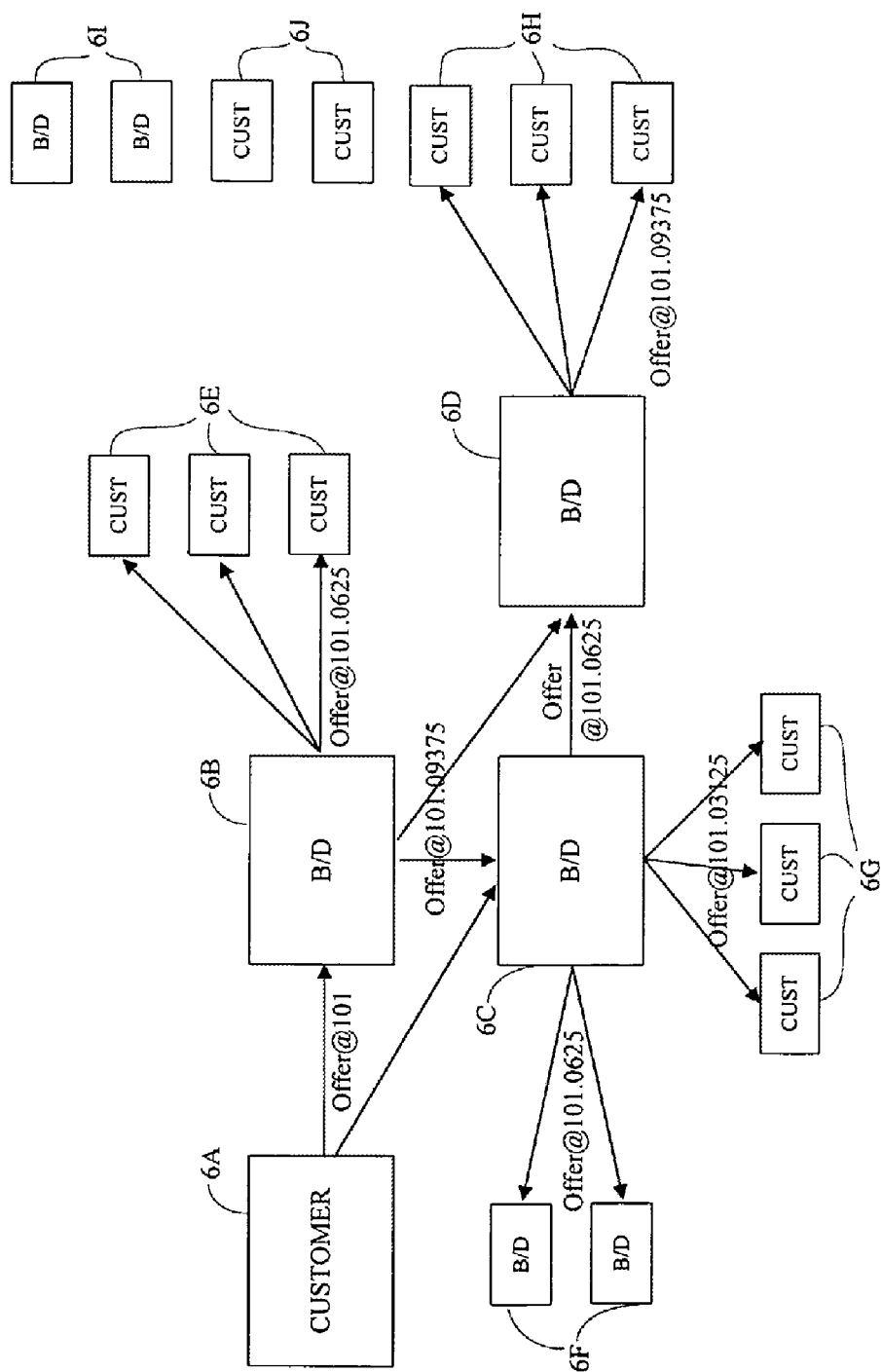
Figure 7:
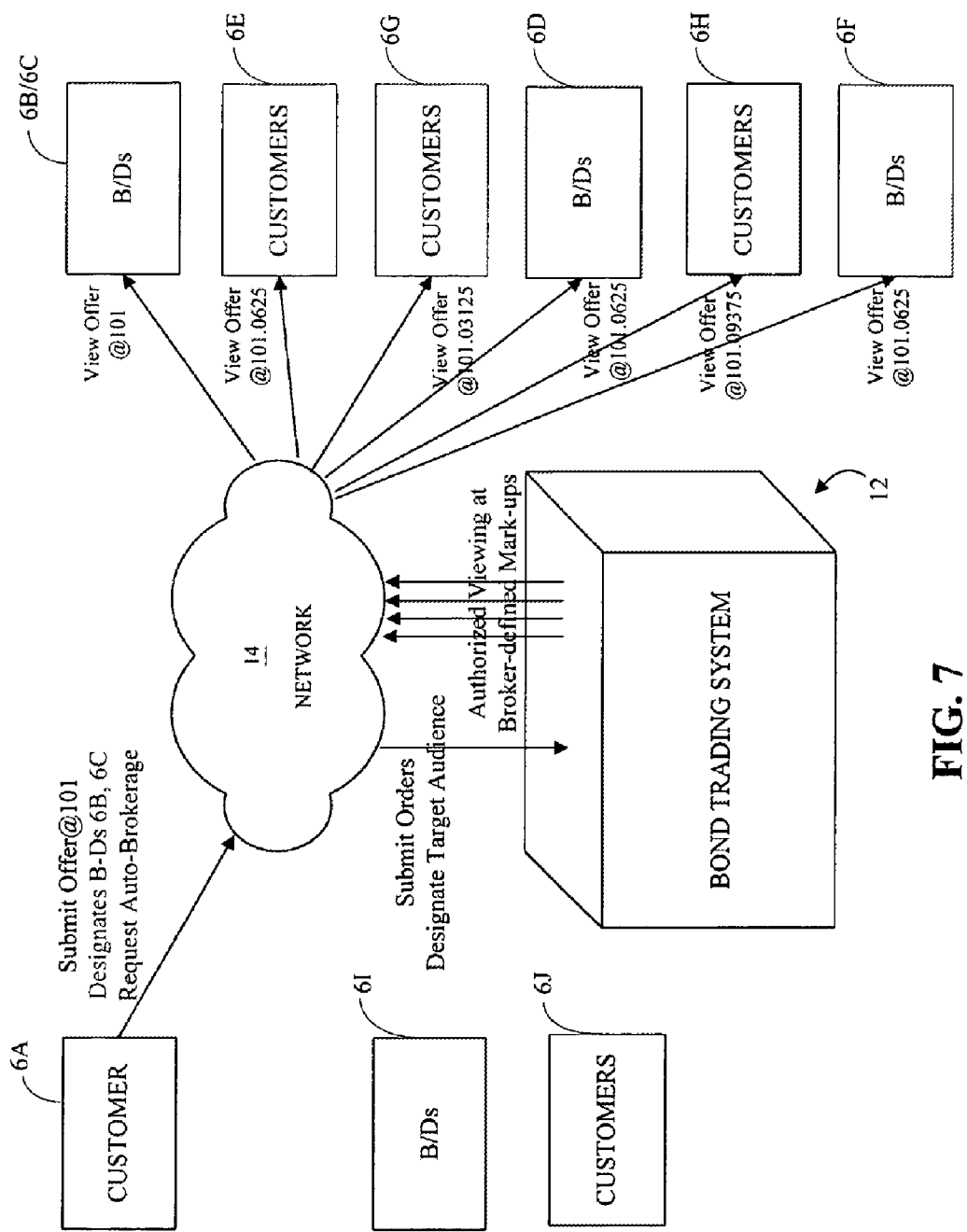

Several illustrations presented in FIGS. 5–7 will assist in the understanding of the operation of the bond trading and order processing systems of various embodiments as described herein. Referring to FIG. 5, a customer 5A submits an offer to sell one or more bonds at $101/each to three broker dealers 5B, 5C, and 5D. The order specifies that broker dealer 5B is not permitted to rebroker the offer but can submit bids to match the order. Broker dealers 5C and 5D are permitted to rebroker the order and do so manually or automatically using the bond trading system of the present invention at a markup. Broker dealer 5C sets a markup of $0.03125, for a total price of $101.03125, and rebrokers the order by issuing new orders at that price to counterparties 5E, 5F, and 5G. These counterparties may be customers or other broker dealers, and in all cases can submit orders relating to the transaction which could be matched with the orders they received. Broker dealer 5D sets a different markup of $0.0625, and thus rebrokers its order at $101.0625 to counterparties 5H and 5I.

In accordance with aspects of the invention, original ordering party 5A chose not to send its order to broker dealers 5J and 5K. Similarly, counterparties 5L and 5M did not receive rebrokered orders for one of several possible reasons, including in various embodiments that: they were not eligible to receive orders from the given sector; they do not qualify based upon parameters set by party 5A; they are not customers of the broker dealers 5C or 5D; or that the rebrokerage rules of broker dealers 5C or 5D preclude rebrokering of orders received from customer 5A to these parties.

FIG. 6 illustrates other aspects of the bond trading system of the present invention. In the scenario illustrated in FIG. 6, customer 6A submits over the system an offer to sell a bond to broker dealers 6B and 6C at $101. Either through a manual decision or the application of its rules, broker dealer 6B rebrokers the offer to broker dealer 6C at a markup of $0.09375. Thus, broker dealer 6C receives two orders relating to the same transaction, in this case, the same bond(s), one from customer 6A at the base price and one from broker dealer 6B at the marked-up price of $101.09375. The marked-up offer would naturally be ignored in favor of the offer at the base price (which in this case is the better price), either manually by the employee acting on behalf of broker dealer 6C, or by the system in the automated rebrokerage embodiment. In other embodiments, the system would post both orders to broker dealer 6B so they are visible and available to the broker dealer, in case the broker dealer would prefer to rely on factors other than price to make the decision which order to rebroker.

In addition, both broker dealers 6B and 6C rebroker the offer to a third broker dealer 6D, the offer from broker dealer 6B being at a marked-up price of $101.09375 and the offer from broker dealer 6C being at a marked-up price of $101.0625. These offers may specify that broker dealer 6D has the right to further rebroker the order to counterparties. The availability to one party of multiple orders relating to the same transaction and that party's ability to resolve such multiple orders in its favor is an important feature provided by the system of the present invention.

Furthermore, the three broker dealers receiving orders in FIG. 6 rebroker the orders to other counterparties. Broker dealer 6B rebrokers the order at a markup of $0.0625 to its customers 6E. This markup is lower than the markup of $0.09375 applied to in the order sent to broker dealers 6C and 6D, which was a decision set by broker dealer 6B in its rules or manually to preclude the broker dealers from undercutting the price to customers. Broker dealer 6C rebrokers the order it received from customer 6A to broker dealers 6F, without the right to rebroker, and to customers 6G. Here, too, the markup used by broker dealer 6C for customers is lower than for the order sent to broker dealers, $0.03125 as compared to $0.0625.

Broker dealer 6D also rebrokers the order to customers 6H, applying a markup of $0.03125 to the order of $101.0625 it received from broker dealer 6C for a total offer at $101.09375. Other broker dealers 6I and customers 6J who are registered with the bond trading system have not received any orders in this transaction and thus do not participate.

If one of customers 6H submits an order which the system determines to match the order it received from broker dealer 6D, the system identifies the parties to be involved in the transaction by tracing the connection from broker dealer 6D to the party who sent it the order its rebrokered order was based upon, in this case broker dealer 6C who provided a better offer, and by further tracing the transaction back from broker dealer 6C to customer 6A who originated the offer. In one embodiment as further described below, this path is stored in the order file as part the order data for the order to customer 6H. Thus, the system identifies the chain 6A–6C–6D–6H for the transaction, and executes the orders between each pair of parties in the chain, i.e., between 6A and 6C at $101, between 6C and 6D at $101.0625, and between 6D and 6H at $101.09375.

This example illustrates several advantages provided by the system. First, a willing trading partner for the offer made by customer 6A was located in customer 6H with whom it might not otherwise have conducted business. In addition, such transaction was accomplished transparently to both customers 6A and 6H, who only are aware of dealing with their broker dealers. The transaction was also anonymous as between the customers.

FIG. 7 illustrates the transaction shown in FIG. 6 as implemented in a full or partially automated embodiment in which rules are used to rebroker orders. In this case, customer 6A sends its offer via the Internet 14 to the order processing server 12, which validates and stores the order. The order processing server 12 then applies the stored rules to determine the rebrokered orders which should be generated based upon the order from customer 6A. The resulting orders, determined using the logic shown in FIG. 6 and stored rules for markups, are then stored in the order table and made available to all the broker dealers 6B, 6C, 6D, and 6F and to customers 6E, 6G, and 6H.

In the scenarios illustrated above, the business rules of the broker dealer are set to provide a given markup for given counterparties and to select orders from two parties on the same bond based on price. In other embodiments, the rules may be set to provide other changes in order parameters or to use other order parameters for selecting among two or more orders on the same bond. For example, the broker dealer may set in its rules that the minimum amount be increased if below a certain threshold, perhaps to avoid doing business on orders which are too small. The increase would still need to be below the maximum amount. In this case, a comparison of two orders would factor both price and minimum amounts, and the recipient would consider both parameters in selecting one of the orders. Alternatively, the rules may be set to change the descriptive data or certain other parameters in the order.

Similarly, the broker dealer in some embodiments may set in its business rules which parameters should be used to select among orders. The broker dealer could select, for example, for the system to select orders based on price, as above, or based on the range in amounts between minimum and maximum, the counterparties specified, whether the order is live or subject, whether the order is based on price or spread, etc.

Figure 8:
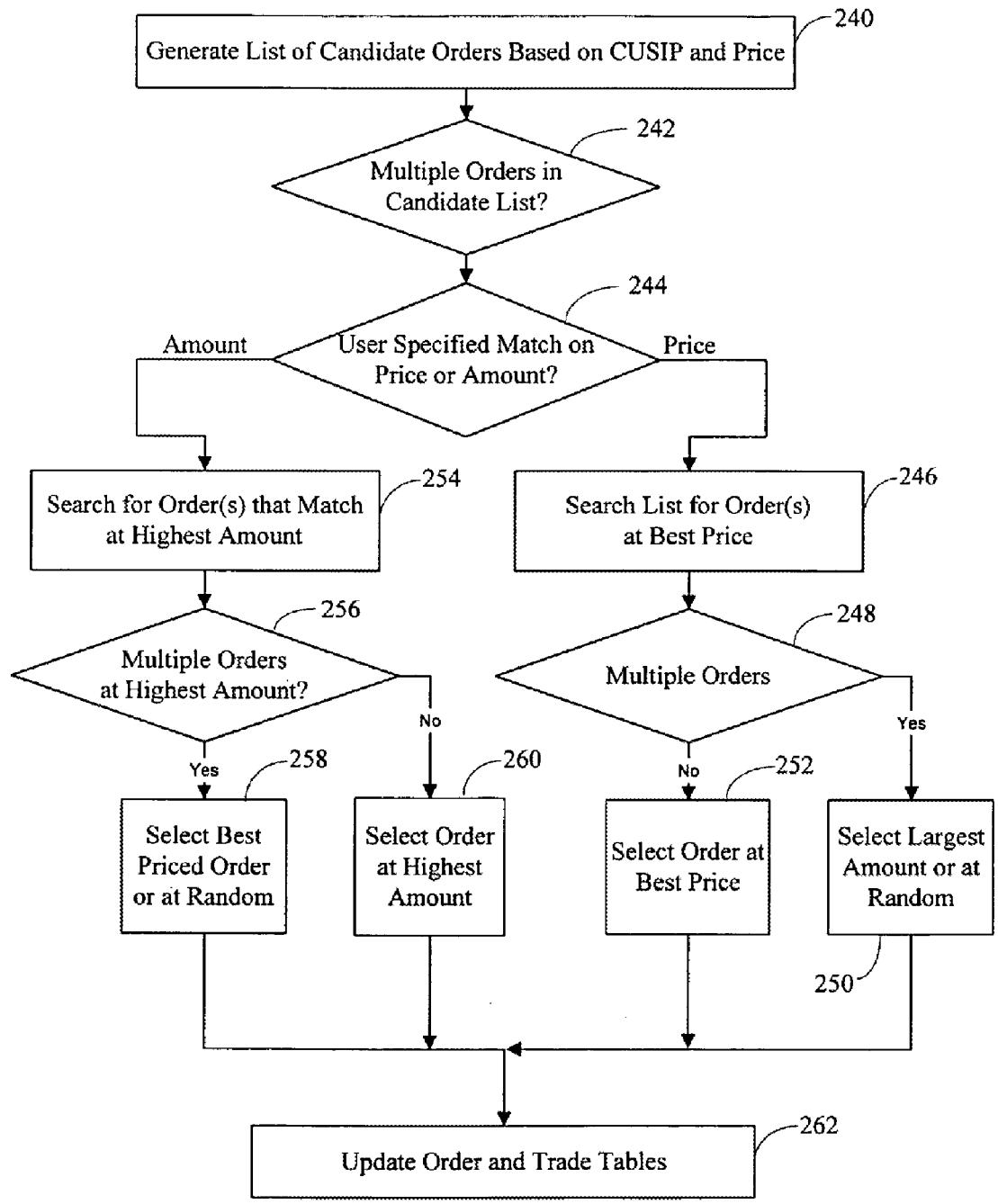
FIG. 8 is a flow chart showing a process for matching orders executed in the system of FIG. 1 in accordance with one embodiment of the present invention.

An exemplary process by which the order processing system matches orders is illustrated in FIG. 8. The matching process is performed for broker dealers, that is, for bids and offers received by a broker dealer. The system performs the matching by first generating a list of candidate offers that partially match a specific order based on, in one embodiment, CUSIP and price, step 240, accounting in price for any markup applied by that broker dealer to the specific counterparty submitting each candidate offer. If the list of candidate offers contains only one offer, this offer is deemed to match and the system updates the order and trade files accordingly to reflect that a trade has occurred, step 262. If the offer was subject, the parties are first notified and confirmation is requested before the trade is executed, as explained above.

If the candidate list contains multiple orders, one of such orders must be selected. In some embodiments, the party that generated the original order can specify whether it prefers a match to occur on price or on amount of securities in the trade. If the user specified a match on price, step 244, the candidate list is searched for one or more orders at the best price, step 246. If multiple such orders at the best price are found, step 248, the system selects the one of such orders having the largest amount of securities, step 250. Otherwise, the order at the best price is selected from the list, step 252. If the user specified a match based upon amount, the candidate list is searched for orders at the highest amount, step 254. If multiple such orders at the highest amount are found, step 256, the order with the best price is selected, step 258; otherwise, the order at the highest amount is selected, step 260. If in either instance after narrowing the list based on price and amount the candidate list still contains multiple orders, one of the orders is selected at random or based on an earlier time of receipt of the order. The selected order is used for the transaction, and the order files and trade files are updated accordingly to reflect that the transaction has occurred, step 262.

As mentioned above and explained more fully below, the ordering party may specify that a matching order must exactly match the number or amount of items being offered, or may specify that a partial fill is acceptable with a displayed amount, a minimum and maximum acceptable amounts, and a tail amount which identifies the minimum amount which must be left over following a partial fill. Since the matching process of one embodiment as just described involves comparing amounts contained in two orders, it involves comparing orders which may vary with respect to these user settings.

For example, if one order is specified as an exact match, the displayed amount of that order must be equal or higher than the other order's minimum amount and either equal to the maximum amount or less than or equal to the maximum amount minus the tail amount. If this condition is satisfied, the displayed amount is selected as the trade amount. If both orders have a user setting of partial fill, the system checks whether the maximum amount of the order with the lowest maximum amount is equal or higher than the other's minimum amount and either equal to the maximum amount or less than or equal to the maximum amount minus the tail amount. If that condition is satisfied, the maximum amount of the order with the lower maximum amount is selected as the trade amount. Stated another way, the amounts set in each order define a set including the interval [min, max-tail] and an extra point at the maximum amount. In the case of an exact match, of course, the set consists only of the displayed amount. The system tries to intersect the respective sets to find a match in amounts.

In some embodiments, the failure to satisfy these conditions results in a finding of no match on amount. In other embodiments, if these conditioned are not satisfied, the system selects the smallest value between the differences of maximum amount minus tail amount of the two orders. That amount, sometimes referred to herein as the try out amount, is selected as an amount to be considered for trading. The parties would then be given the option to pursue a transaction on that amount.

In some embodiments, a user may further specify a hidden maximum amount for an order, which is a higher maximum amount the user would be willing to trade than actually displayed as the displayed exact amount or displayed maximum amount. This hidden maximum amount would then be used in the matching process described above instead of the displayed exact or maximum amount.

Further embodiments provide for orders to be based not only on price but on spread. Spread in the bond market is understood as yield spread to a reference security, calculated by subtracting the yield in basis points (each point being $\frac{1}{100}^{th}$ percent) of the reference instrument from the yield of a bond. The instrument may be a treasury, an interpolated point on the treasury yield curve, or a specific term of LIBOR. The yield spread allows the two parties in a transaction to negotiate a trade without having to change prices each time the market goes up or down, but rather to agree on the spread, the reference instrument, and the yield at the time of the trade. The price can then be calculated based on this yield as understood by those skilled in the art.

When specifying an order based on yield, the ordering party must make the order subject, so that a price can be computed from agreed upon spread terms before a transaction is executed. In addition, the ordering party specifies spread in basis points and reference instrument. Preferably, the system stores a list of standard instruments from which users may select in order to maintain consistency in representations to drive matches. The system matches two spread orders having the same CUSIP, settlement dates, spread in basis points, and reference instruments, and compatible amounts. When a match is found between two spread orders, the system notifies the parties of the match and their need to change the subject, spread based orders to live, price based orders in order to complete a trade. To allow matching to occur at a broker dealer for both types of orders, broker dealers would set their markups in terms of both price and spread at the time such an order is rebrokered or as part of the stored rules.

Details of one specific implementation of the bond trading system of the present invention are now described, including exemplary screen displays shown in FIGS. 9–12, the data structures supporting orders and parties involved in the system, and the XML format used to support the transfers of data and notifications of parties. It will be understood by one skilled in the art that these details describe one particular implementation in a given computing environment, and that many alternatives are available to provide substantially the same functionality as described herein.

Figure 9:
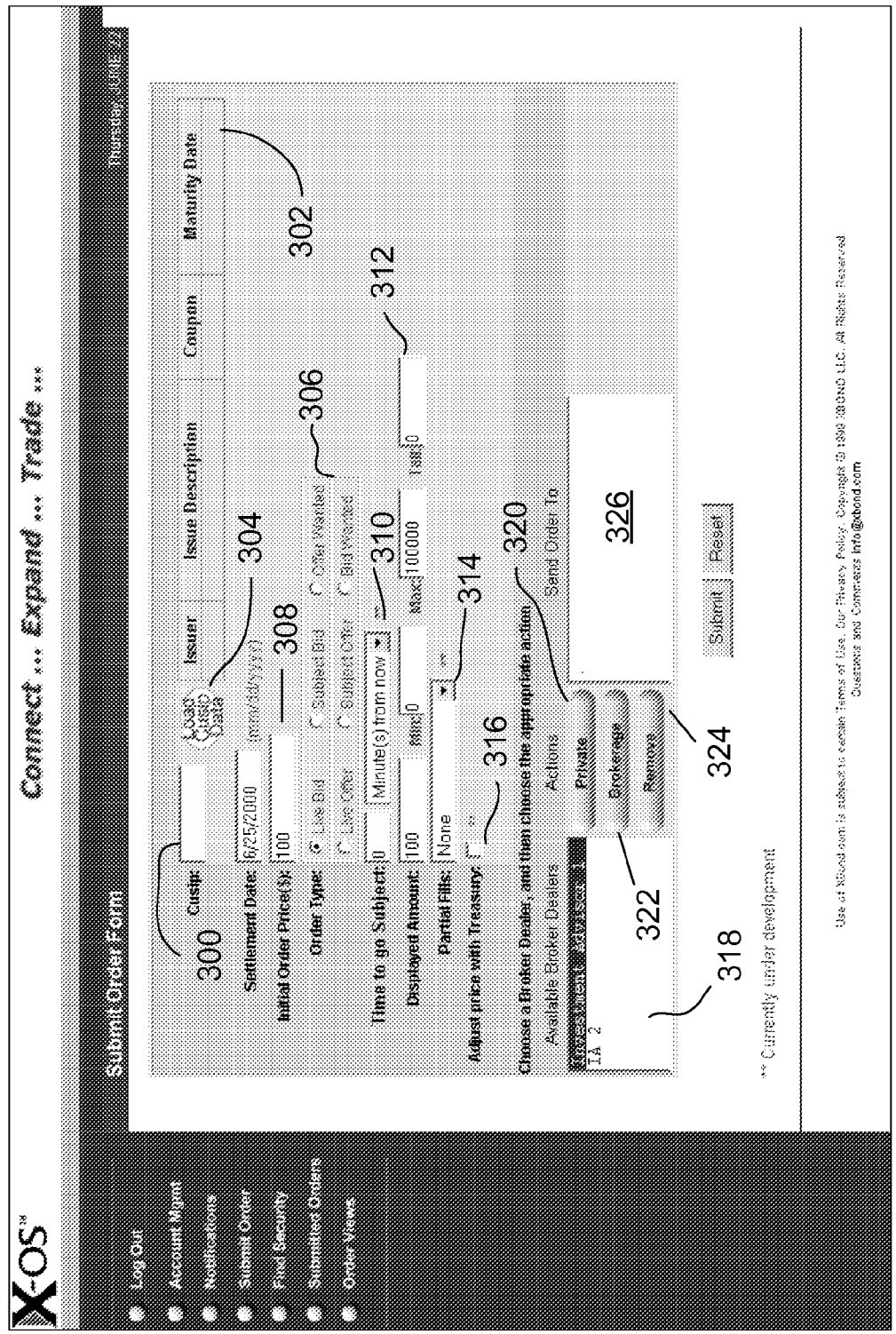

As explained above a graphical user interface is presented to clients as markup documents readable in clients' browser programs. Such a GUI includes screens for submitting orders, rebrokering orders, displaying orders which may be rebrokered, and displaying all or subsets of orders available to a party. An ordering screen is shown in FIG. 9. The screen contains an input field 300 for entry of a bond's CUSIP, and input fields 302 for additional bond data including issuer data, coupon, and maturity and settlement dates. In one embodiment, the system stores a database of bonds and related data, and the input CUSIP can be used by activating a "Load CUSIP Data" icon 304 to query the database and retrieve the remaining bond information for automatic filling of the other input fields 302.

The screen in FIG. 9 further contains fields for selecting the type of order 306 and the initial order price or spread 308. Depending upon whether a live or subject bid/offer is selected, the screen displays an input field 310 for allowing the user to set a time period after which the order will go from being live or subject to subject or live, respectively. The user enters the amount information in amount fields 312, including a displayed amount and, if an exact match is not requested, minimum, maximum and tails. If a displayed amount is input as well as minimum and maximums, these latter values are kept hidden and used for matching purposes.

A partial fill field 314 allows the user to select how an order will be adjusted in response to execution of a transaction in amounts less than the maximum amount. The drop down list values are None (meaning that partial fills are now allowed, which causes the GUI program to disable the input fields for minimum and maximum amounts); With New Order (which allows partial fills based on minimum amount and directs the system to automatically generate a new order with the remainder and carrying over the user set terms, as discussed above); and Without New Orders (which allows partial fills but does not direct the system to generate new orders with any remainder).

An Adjust Price with Treasury field 316 allows a user to specify whether the price will be adjusted according to continually updated CMT yields. When the field 316 is checked, additional fields are presented which allow the user to specify: the value of one basis point change in treasury yield, which represents the ratio of CMT movements to price movements; the yield shift in basis points, which may be positive or negative; the treasury maturity, in years; and an initial treasury yield, representing the initial percentage rate of return.

Box 318 in FIG. 9 presents the user with the user's list of counterparties and broker dealers to whom it may communicate rebrokered orders. As described above, this list is stored in the system database and retrieved for presentation to the user. The user selects one of the names in the list in box 318, and selects either the "private" button 320 to designate this counterparty as receiving the order but only to submit counter orders and not to rebroker, or the "brokerage" button 322 to designate the selected party for rebrokering of the order to others. The selected party is then listed in the "send order to" box 326. A "remove" button 324 is used to delete previously selected names from the "send order to" box.

Once the order form is completed and the user selects the submit button, a client API made with COM components formulates an XML message. The client API formulates the message using either the Microsoft XML parser or string concatenation. The API sends messages to the system one of two ways, depending on the way the XML message is formed. If the parser is used, the XML HTTP object will be used to post the message to an ASP object. If the parser not used, the XML message will be posted to an ASP page via a form submit. Once the message is processed, a valid XML message will be returned as a response to the client. The API will then populate the response collection of the API based on the contents of the return message.

An example of an XML schema definition for a SubmitOrder document and a sample document are set forth below:

```
<SubmitOrder type="1"> <!--Type: Offer=1 Bid=2 MakeOffer=3 MakeBid=4 -->
  <Security>
  <UserName>Kenjon</UserName>
  <Password>pwd</Password>
  </Security>
  <Cusip>CUSIPA</Cusip>
  <Amounts>
  <Displayed>10000</Displayed>
  <Minimum>5000</Minimum>
  <Maximum>20000</Maximum>
  </Amounts>
  <Price>
  <Amount>100.625</Amount>
  <Currency>USD</Currency>
  </Price>
  <SettlementDate>02/15/2000</SettlementDate>
  <BrokerDealers>
  <BrokerDealer>
    <BrokerDealerUserId Rebroker="1">1</BrokerDealerUserId> <!-- Rebroker Rebroker=1 Private=2 Rebroker/Counter=3 Private/Counter=4-->
  </BrokerDealer>
  <BrokerDealer>
    <BrokerDealerUserId Rebroker="3">2</BrokerDealerUserId>
  </BrokerDealer>
  </BrokerDealers>
  <Alert>Pager</Alert>
  <Comment>This is a sample comment.</Comment>
  <Optional>
  <CMT>
    <InitialCMTYield>1</InitialCMTYield>
```

```
<AdjustWithCMT>
    <CMTMaturity>20</CMTMaturity>
    <PriceAdjust1 BPCMTYieldChange>1</PriceAdjust1 BPCMTYieldChange>
</AdjustWithCMT>
</CMT>
<LiveSubject>
    <Subject>
        <TimeToGoSubject>1 Hour</TimeToGoSubject>
        <BeforeGoingSubject>
            <MinCmtYield>1</MinCmtYield>
            <MaxCmtYield>2</MaxCmtYield>
        </BeforeGoingSubject>
    </Subject>
</LiveSubject>
<PartialFills>No</PartialFills>
</Optional>
</SubmitOrder>
```

Submitted orders are written into two tables in the database. The order table holds the general order information and a BrokerDealerOrder table is populated with the IDs of the broker/dealers for which the order was submitted. For a single customer this will be just one broker/dealer; however, a master customer could submit the order to several different broker/dealers. Once the order is written to the appropriate tables the broker/dealers may be required to approve the order for rebrokering. Once this approval is completed the internal rebroker and matching methods are called.

The rebroker method populates a SubOrder table that is used for order viewing. This table contains the ID of the order, the route number, the broker/dealer the order was rebrokered to, and the updated price. This table is used for efficient order viewing. When viewing an order, the SubOrder table is queried for the customer's broker/dealer. The SubOrder table is populated by querying CounterParty-OrderSituation and Path tables, described in greater detail below. Once a component has been rebrokered the matching process is called to determine if there are two orders that qualify as a match. Once a match occurs the route number is used to notify all parties involved in the match. This includes the buying and selling customer. All intermediaries are notified of any markup or commission received on the match. The order is then marked as inactive and a record is written to the match table to record the matching transaction.

A customer or broker/dealer can view an order if they have the appropriate relationship with the submitting broker/dealer. Customer preferences are also used to filter the orders that are returned during a viewing operation.

In the currently described implementation, the database is an object oriented relational database such as is available from Oracle. Orders are stored as objects in this database which are created by the order processing component. The order objects include the following methods and properties:

Orders Methods

| | |
|---|---|
| Add | Add an Order to the collection. This returns a reference to the new Order object. |
| Remove | Remove an Order from the collection. This is based on index, or possibly a key (username). |
| Item | Returns an Order object based on index or key (username). |

Orders Properties

| | |
|---|---|
| Count | The number of Order objects in the collection. This is read-only and is set by calling Add and Remove. |
| Cusip | The Cusip identification of the bond. |
| OrderType | Type of the order:<br>Offer = 1<br>Bid = 2<br>Make Offer = 3<br>Make Bid = 4 |
| Live | A match is found by X Bond and is executed. |
| Subject | Finds a pending match and the user is notified. |
| DisplayAmount | Par amount of the bond that is displayed to authorized users. |
| ParMinAmount | Minimum par amount that a user will execute, displayed to authorized users. |
| ParMaxAmount | Maximum par amount that a user will execute, not displayed to authorized users. |
| Price | Order price executed by the user. |
| SettlementDate | Date on which the user will deliver or receive the bonds in exchange for payment. |
| BrokerDealers | A collection of Broker Dealer objects representing participating broker dealers authorized to view trade order as well as specific options for each individual broker dealer. |

Broker Dealer Methods

| | |
|---|---|
| Add | Add a Broker Dealer to the collection. This returns a reference to the new Broker Dealer object. |
| Remove | Remove a Broker Dealer from the collection. This is based on index, or possibly a key (username). |
| Item | Returns a Broker Dealer object based on index or key (username). |
| Count | The number of Broker Dealer objects in the collection. This is read-only and is set by calling Add and Remove. |

Broker Dealer Properties

| | |
|---|---|
| Id | The broker dealer identification number. |
| Rebroker | Rebrokering setting. |
| CustGroups | Collection of pre-defined customer groups and price information that a participating broker dealer authorizes to view the trade order. This applies only to participating broker dealers. |
| AlertMethod | Method of notification (i.e., email, instant message, page, phone call, etc.) upon a match.<br>Email = 1<br>Page = 2 |
| Comment | Selection from approved list of verbal comments about the trade order to be displayed to authorized viewers. |
| Status | Status of orders. |
| AdjWithCMT | Specifies that price will be adjusted according to continually updated Constant Maturity Treasury yield. |
| CMTMaturity | Designation of CMT maturity. |
| AdjPerCMTYieldChange | Ratio of CMT movements to price movements. |
| InitialCMTYield | |
| MinCMTYieldBeforeSubject | A value that if the CMT yield drops below, the trade order becomes subject. |
| MaxCMTYieldBeforeSubject | A value that if the CMT yield rises above, the trade order becomes subject. |
| SubjectTime | A time relative to trade order or absolute at which the live/subject flag is set to subject. |
| LiveTime | A time relative to trade order or absolute at which the live/subject flag is set to live. |
| PartialFills | Selection on how order will be adjusted in response to execution in amounts less than maximum amount. |

Figure 10:
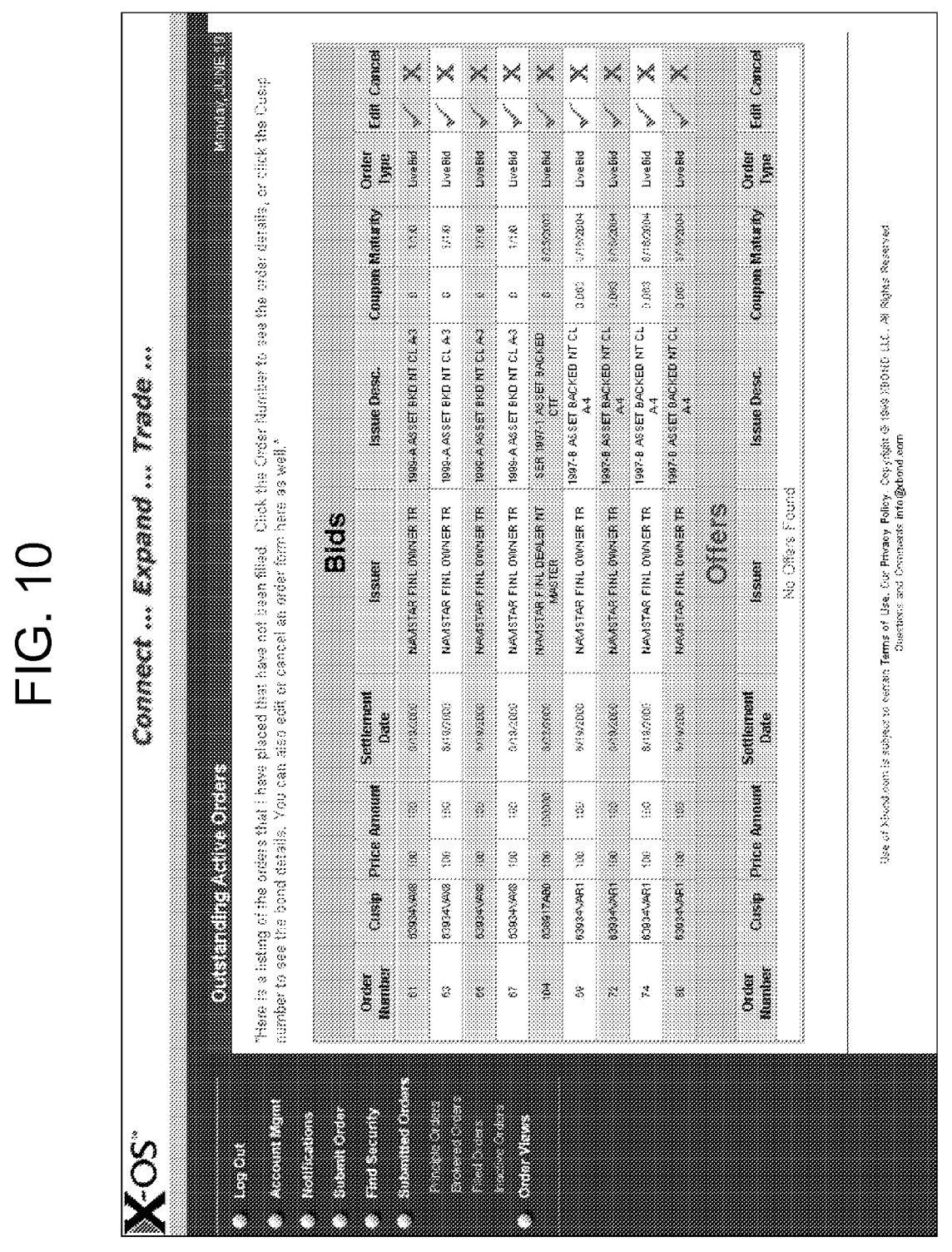

Broker/dealers and customer can access the orders sent to them as stored in the order tables. FIG. 10 shows an exemplary screen display by which available orders are presented, including bond information, order type (live bid, live offer, subject bid, etc.), status (whether it has been matched, is still active, or has become inactive though a change in order), and whether rebrokering is permitted.

Figure 11:
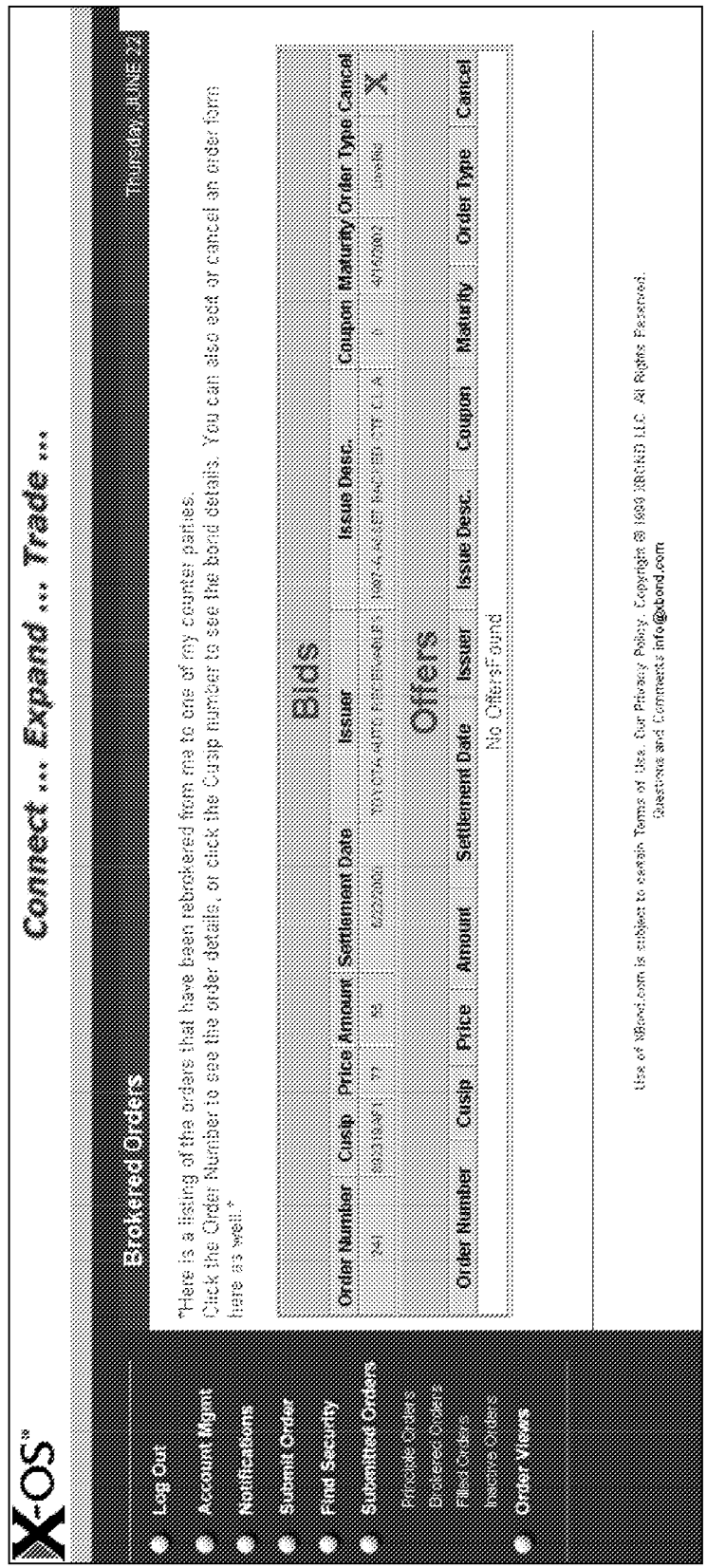
Figure 12:
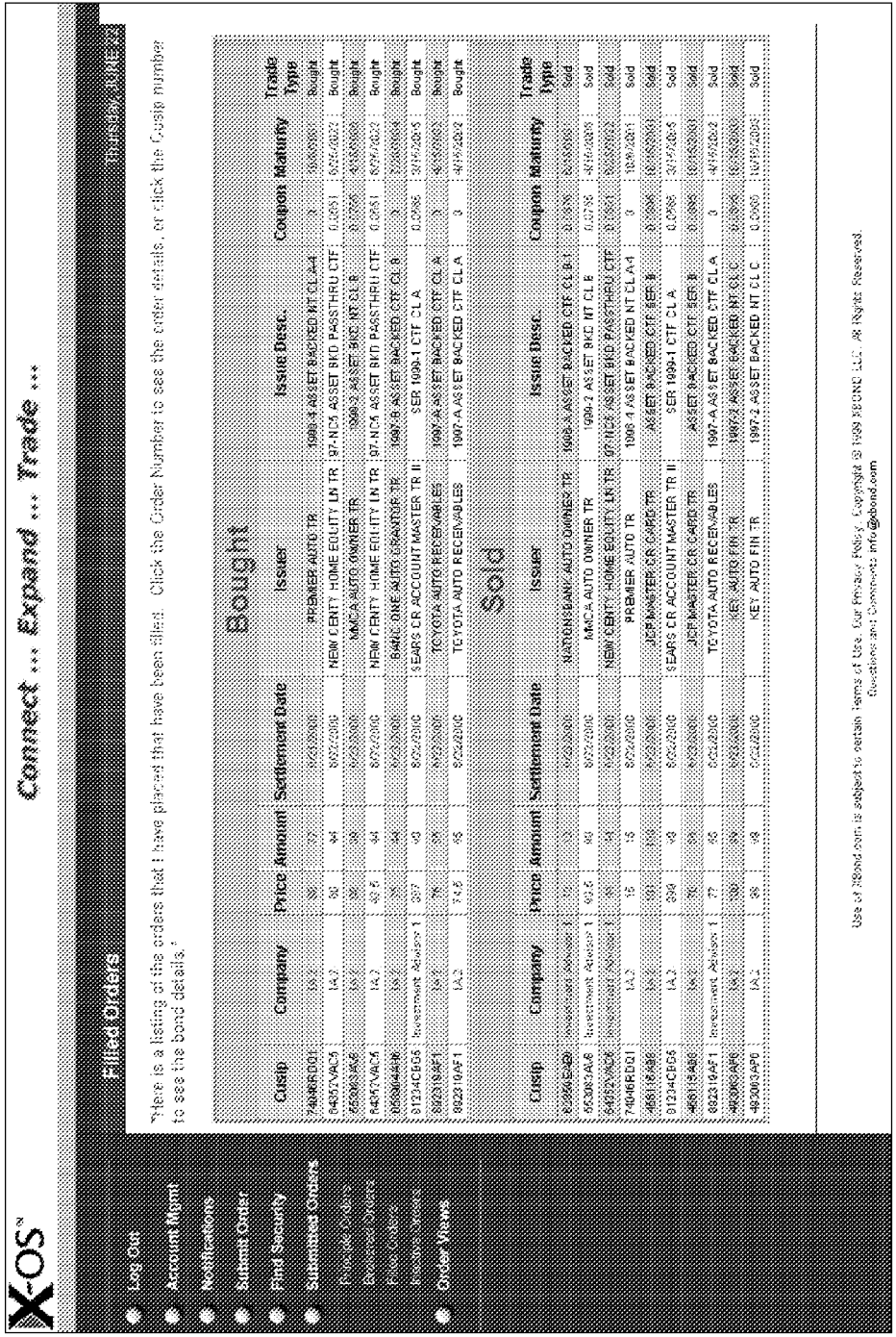

Users can perform searches on the data in the database by any given field to retrieve subsets of order listings. FIG. 11 shows a screen display of one such subset, orders which have been brokered to the broker dealer, and FIG. 12 shows a screen display of another such subset, orders which the broker dealer has filled.

FIG. 13 shows a screen display listing live orders viewable by the particular party. In FIG. 13, the system displays a rebroker field 330 indicating for the associated order whether rebrokering is permitted, and allowing the broker dealer to rebroker the order by selecting the rebroker indicator 332. The GUI then displays a screen such as shown in FIG. 14. The bond and order information for the selected order is automatically entered in various input fields. A markup field 350 accepts the broker dealer's desired markup for the rebrokered order. Candidate list box 352 and "send order to" box 354 function in similar fashion to the counterpart boxes in FIG. 9, with "add" and "remove" buttons to move names into and out of the order list 354.

Figure 15:
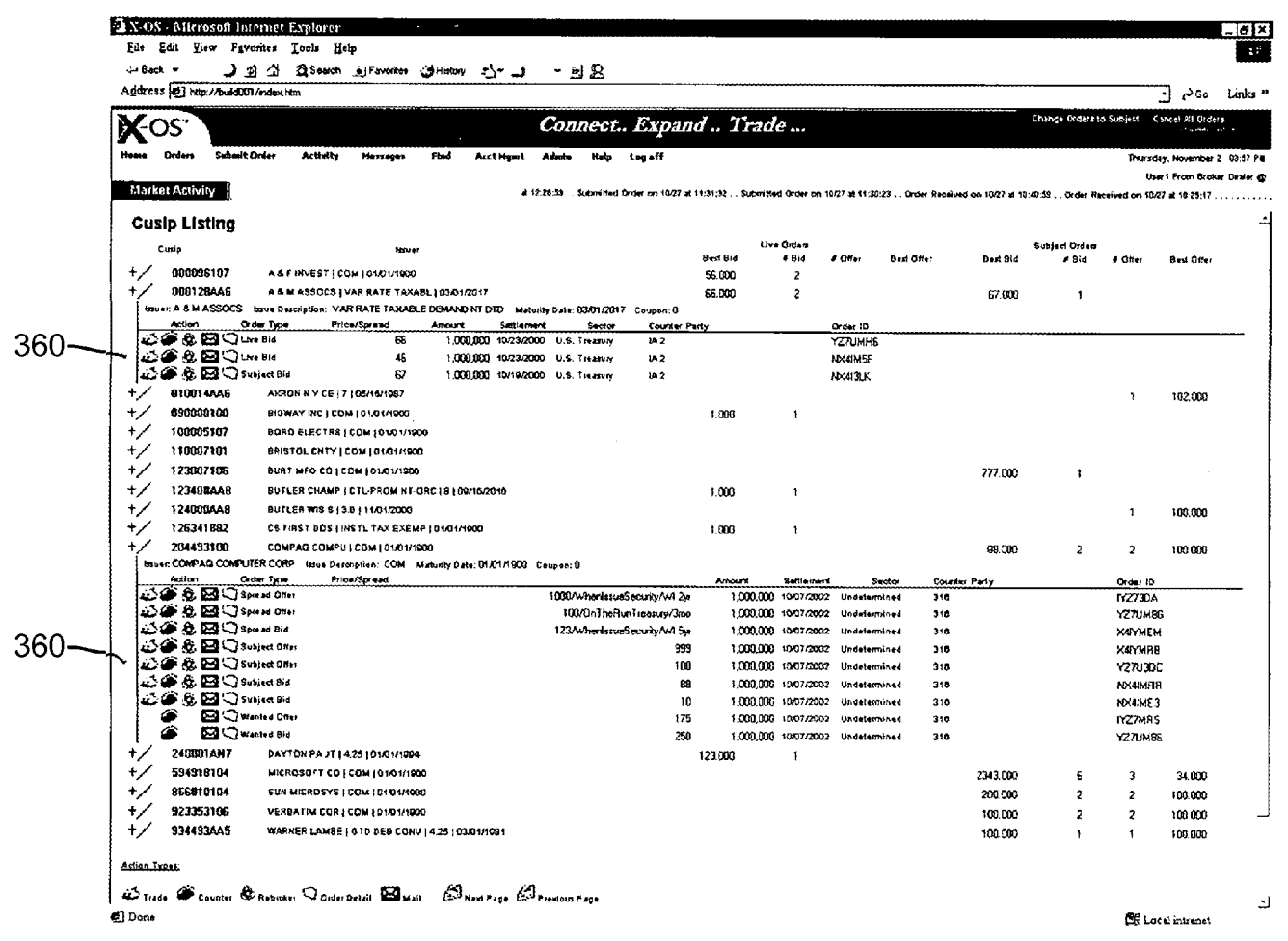

In one embodiment, the GUI generating the screen displays discussed herein supports the ability of the user to select an order in the listing of orders and retrieve and view all order received relating to the selected order. For example, as shown in FIG. 15, an expanded area 360 is displayed listing all order activity relating to the selected bonds for A&M Assocs and COMPAQ Computer Corp. An applet, control, or other link or program embedded within the GUI program issues a query to the order table at the server to retrieve the desired data. The GUI also displays active icons indicating whether each order may be traded, countered with a counter order, or rebrokered to other counterparties.

When rebrokering is requested, an order brokerage record is created for every company that can see an order. This includes a record for the originating company and one record for every company an order is sent to. If an order is sent to a company via different paths, one record is created for each path. The order brokerage record contains the basic order information, including all the information needed to make a match. This is the information displayed to any user other than the owner of the order.

The system stores certain information in association with each order brokerage record. This includes the order brokerage path which determines the route the order took from the originating company to the present order. The path includes the related order brokerage records on each hop. The order brokerage record also has a list of companies to which the order was sent. The list has a reference to the order brokerage record created for the other company and the markup applied to the order.

The order brokerage record may contain a Not Send To Markup field to be applied when receiving a matching order from a company other than those specified in the send to list mentioned above. The price on every order brokerage record is kept separate from the cumulative markup. A user thus sees only one price which is the result of adding the price and the cumulative markup values. The price is saved on a different column, to allow for very fast processing of price changes resulting from Treasury Feeds.

If a user modifies an order, all the order brokerage records associated with that order are canceled. If a company deletes an order brokerage, all the order brokerage records derived from this one are canceled. If a company recalls the order sent to somebody or changes the markup, all the order brokerage records derived from that one are canceled. A change is implemented by first canceling the pending order followed by creation of a new order. This helps proper processing of the new order.

All the processing of an order corresponding to an individual company is performed in one thread of execution. When an order is sent from one company to another, a new thread (using a queued message) processes the order for the receiving company.

As discussed above, when an order is sent to a company, that company's rules are processed. All the active rules are processed in order of precedence. The process stops when all the conditions of a rule are satisfied. A rule need not have any conditions, in which case it is always satisfied by any order. When used, conditions in rules are expressed in the form of field names, operators and values. In one embodiment, the possible operators are:

Equal
Different
Less Than
Less Or Equal Than
Greater Than
Greater or Equal Than
Between
In Set
Not In Set
Contains and Starts With Rules specify the ID of the company or group of companies to send an order to. Each ID has a markup associated with it. Using the list of companies and group of companies, a list of company IDs is produced. The associated markup is the lowest markup at which that company was specified.

Figure 16:
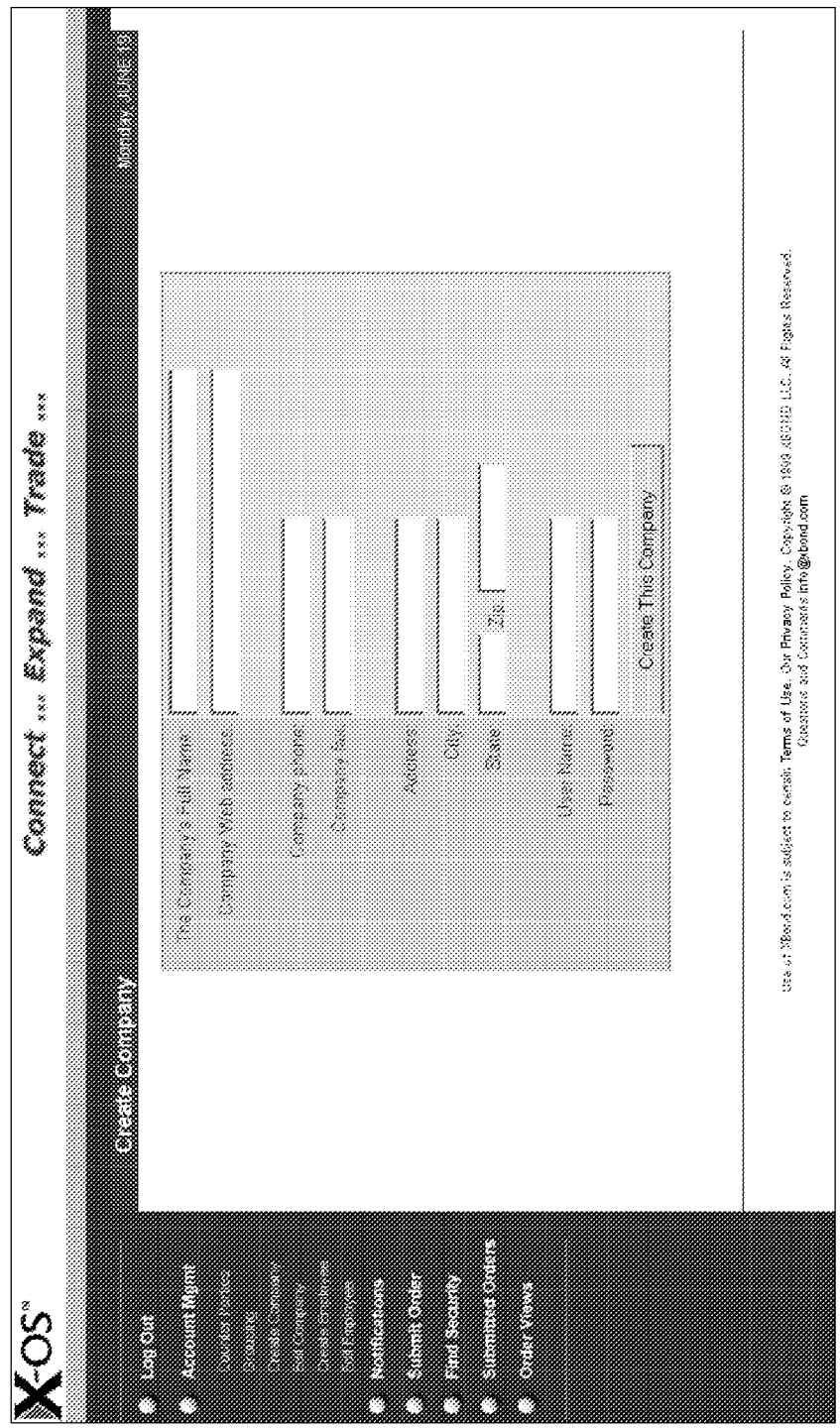

In order for anyone to trade in the system they must have a company and an employee setup. Companies are used to set the relationship that allows them to trade with other companies. The system stores basic information about the company along with a unique identifier, e.g., the tax ID of the company. An exemplary screen display for the entry of data for a new company object is shown in FIG. 16. The system supports three types of company data structures: Broker-Dealers, Investment Advisors, and the System Administrator. The System Administrator sets up Broker-Dealers who have agreed to the terms for using the system. Broker-Dealers (and the System Administrator) then set up their customers as Investment Advisors. Only company administrators can create other companies.

When creating a company, the tax ID is used to see if the company already exists on the system. If not, the company's data structure is generated. If the company does exist on the system, relationships can be set up with the company. Additionally, an administrator type employee is created when a company is created. When a company is deleted (marked inactive), all orders and employees of the company are deleted (marked inactive) from the system as well.

Figure 17:
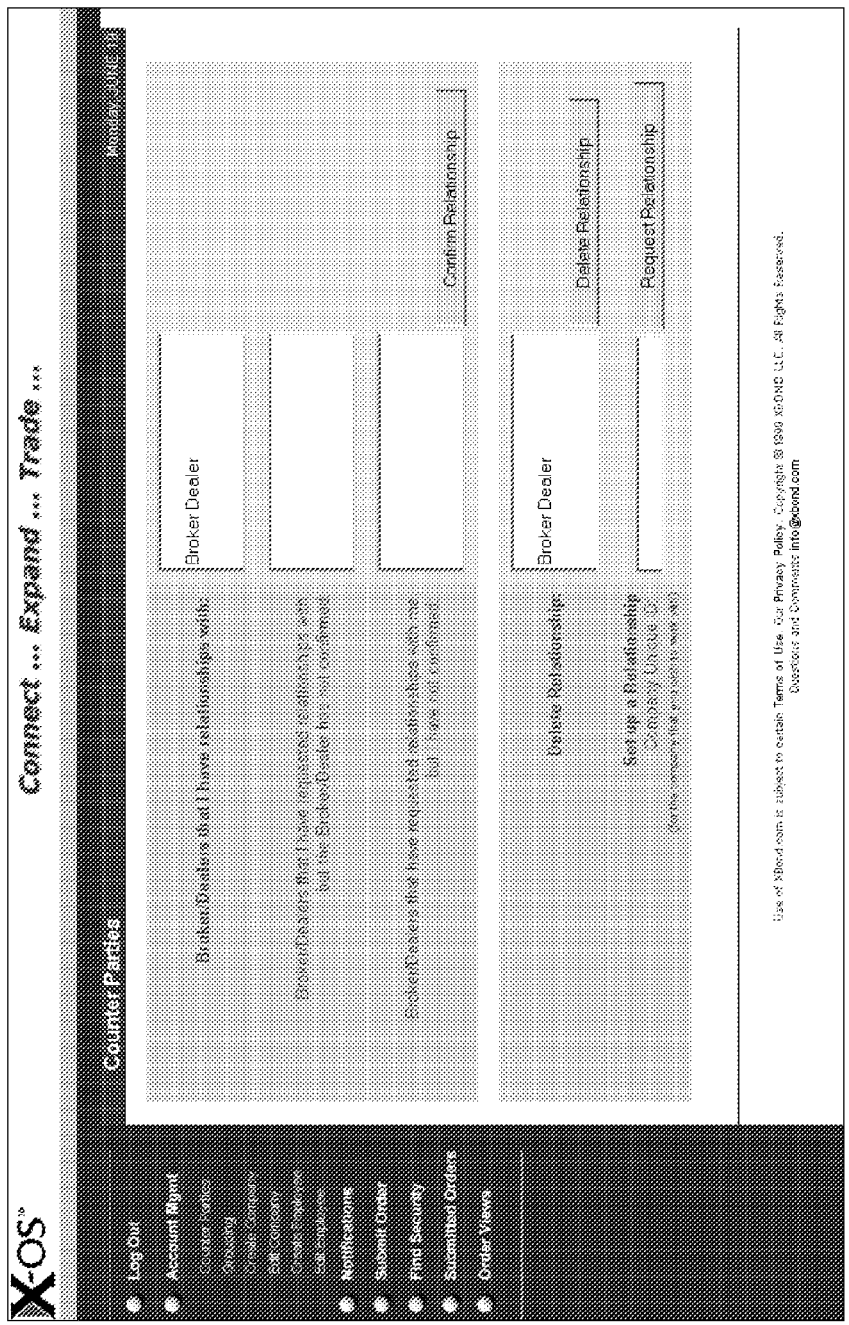

Relationships allow companies on the system to actually trade with each other. There are two types of relationships: Broker-Dealer to Broker-Dealer and Broker-Dealer to Investment Advisor. Orders cannot be sent to, rebrokered to or received from a company unless the relationship has been setup. Then includes the relationship from both sides. A company establishes a relationship with another company through the screen display shown in FIG. 17. When a company requests a relationship with another company, the other company must confirm it. The screen display in FIG. 17 shows fields for listing companies that a party has requested a relationship with but that have not yet confirmed and a field for listing companies which have requested a relationship with the party but which the party has not yet confirmed. A relationship is automatically set up when a Broker-Dealer creates a company. Also, if one company ends the relationship, it is broken; therefore, when a relationship is broken, all orders that were sent between the two are deleted as well.

Figure 18:
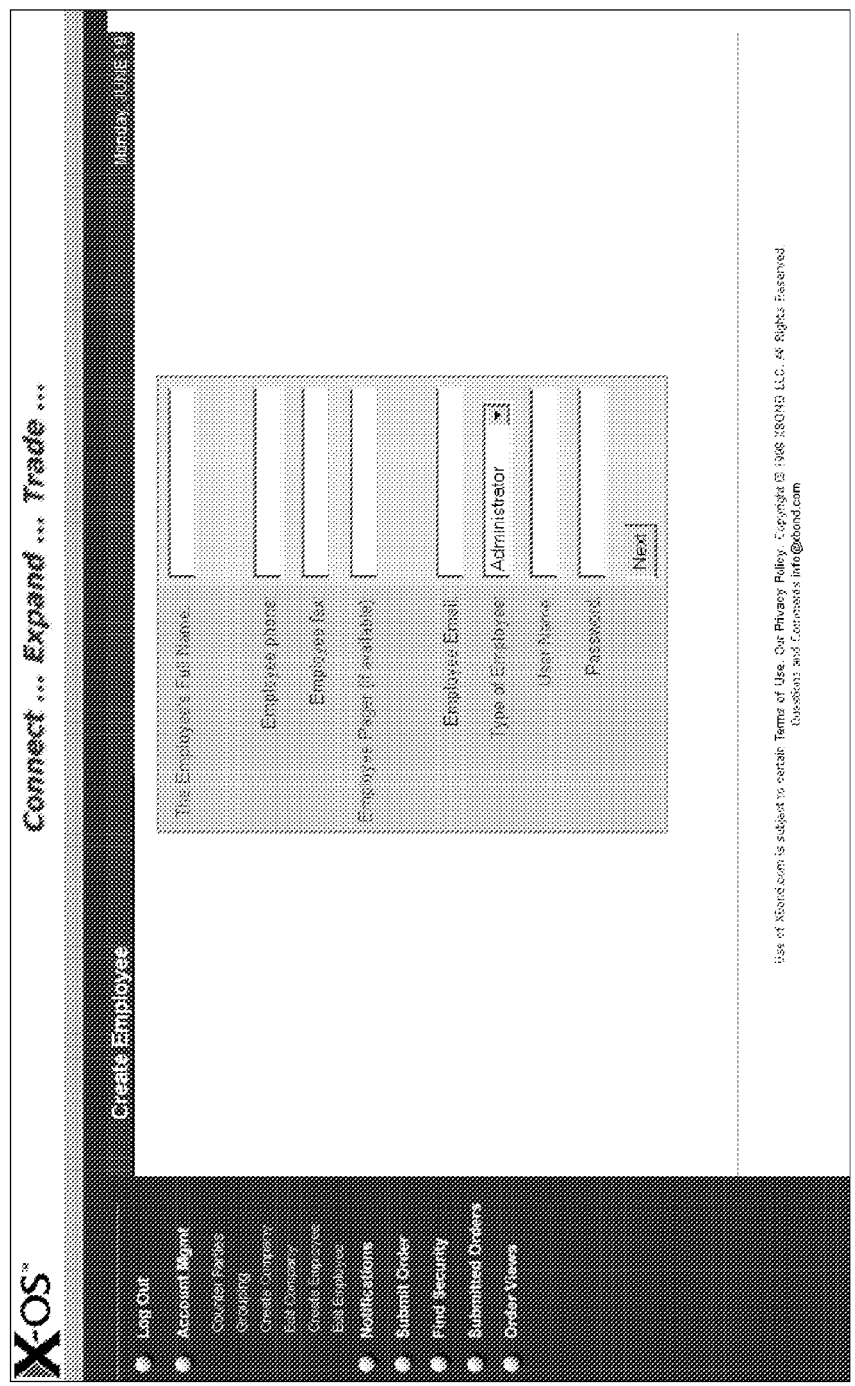

Employees are the actual users of the system, and the system stores an object for each employee. Each company must have at least one user on the system. New employee data is input to the system through the screen display in FIG. 18. There are five different types of employee users supported by the system, including Administrator, Analyst, Assistant, Salesperson, and Trader. Each of these types of users has different rights on the system depending on the company and type of employee. When an employee object is deleted (marked inactive), all orders submitted by that employee are deleted (marked inactive). Each employee type will have a predefined list of rights applied to the user at time of creation of the employee object.

In accordance with another advantageous feature of the present invention, the system support the creation and storage of groups to make the system easier to use when a given user has a large number of counterparties. A group is defined through an object which stores the characteristics associated with that group. In one embodiment, groups contain and are used for characterizing counterparties, employees, orders, rules, or any other objects in the system. Groups with counter parties can be added, updated and removed from the system. Groups are mainly used when rebrokering orders. When an order is manually rebrokered it can be sent to individual counter parties, to groups or to both. Groups can also be used with rules. If a rule is setup to automatically rebroker an order, it can be to a group.

In accordance with another aspect of the present invention, the system contains a library of subroutines used to simplify the interface of the system with certain devices or subsystems so that client programs can communicate with them. This library or collection constitutes an application programming interface (API) and is a package of COM+ components which allow client systems to integrate with the bond order system without creating XML messages, reducing development time and integration time significantly. The bond system API performs a wide variety of functions, from submitting and viewing orders, to adding companies and their employees into the bond order system. Depending on the function, the API programmer sets different properties for the object(s) that the function utilizes.

Figure 19:
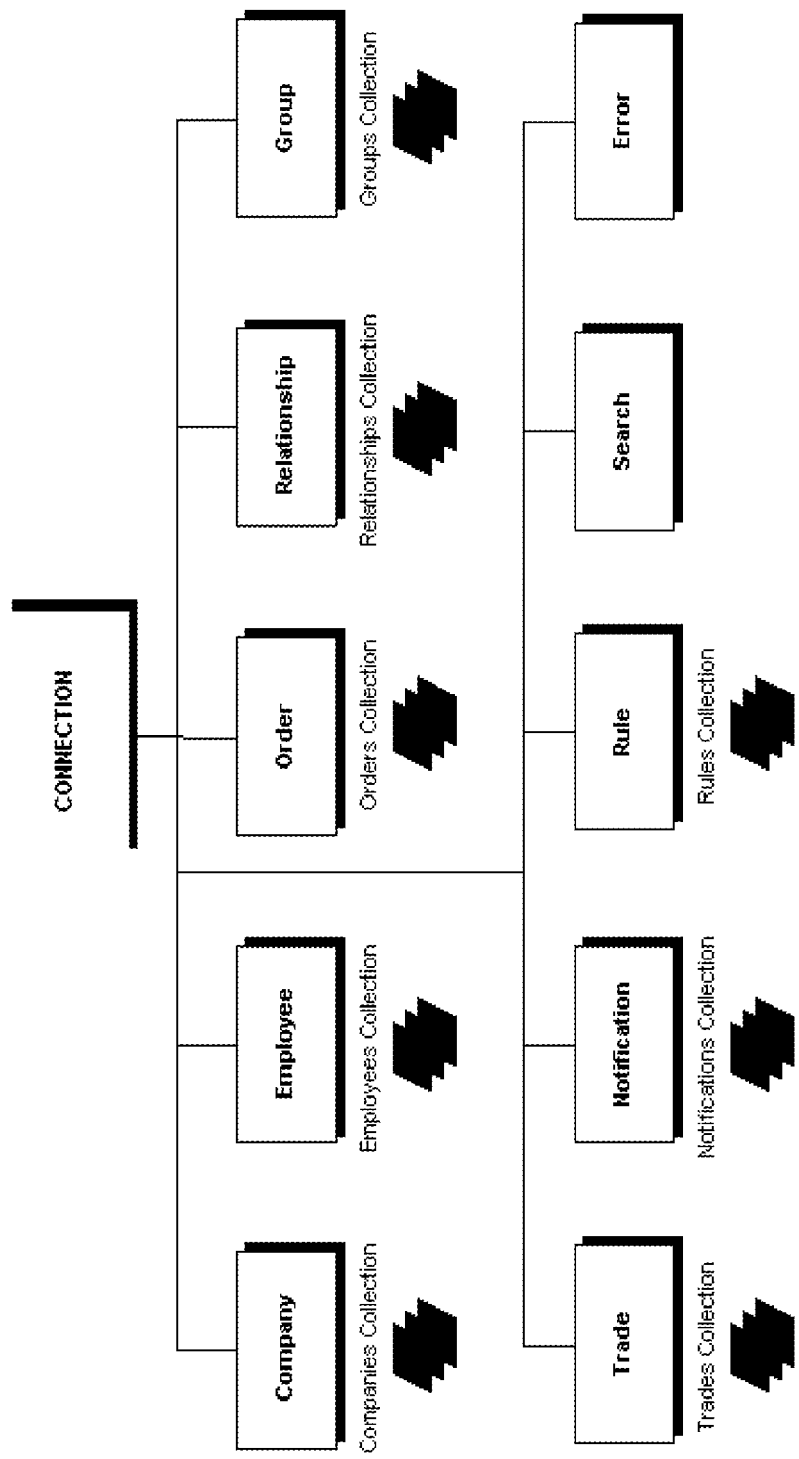
FIG. 19 is a block diagram showing an object model supporting one embodiment of the present invention.

The API is composed of one public component and several internal components. The object model of one embodiment of the present invention is illustrated in FIG. 19. As shown in the Figure, the Connection component is the top-level component of the bond order system API, with other components as discussed above. The format for various, exemplary XML messages supporting various functions relating to these components are contained in the Appendix following the specification.

The bond order system of one embodiment has the following levels of authorizing an operation in this order of execution:

1. The operation must be requested by a valid system user. (CreateCompany and CreateEmployee messages are possible exceptions to this level.)

2. The user has the right for the desired operation as specified in the rights list.

3. The user has the right to trade in the given sector. The trade operation can be constrained to a group of sectors. Sectors are defined with a hierarchical ID. This ID natively includes the IDs of all the parent sectors of a given sub-sector (e.g., Mortgage Back Securities="A" and its sub-sectors Agency Task Through Pols and Agency Remics will be assigned "AA" and "AB" respectively.)

4. The user works for the company for which he/she is trying an operation.

5. The user has the right to view orders belonging to a group of sectors.

6. The user has the right to view orders received from/sent to a group of individual companies. Company groups are created to handle view order level authorization.

As explained above, the bond order system notifies parties upon the occurrence of various events. In one embodiment, the system has three general categories of notifications: Action, Confirmation, and Information. An Action notification corresponds to those notifications that are generated when the system records an action that requires further processing (e.g., authorization, confirmation, approval, etc.) These notifications are created with a status of "Active". A Confirmation notification is generated when an action in the system is authorizing, confirming, approving, etc. an awaiting Action. This notification is created with a status of "Inactive" and is also set the matching open Action notification to "Inactive". An Information notification is for information purposes only. This is generated as a way of keeping track of what is happening in the system, and serves as a way of logging business events.

Notifications are further classified by Notification Types. These types are used as the means to associate "Action" notifications and "Confirmation" notifications. The system keeps a table, "NotificationType", on which it stores all the types and associated types. Through this table it links Action notifications with Confirmation notifications. The system generates and sends a notification for the following scenarios:

New Live order brokered to the user.
Trade.
New relationship offered to the user.
Confirmation that the user have submitted an order.
Confirmation that the user has canceled an order.
Another order is placed on a CUSIP for which the user has an outstanding order.
One of the user's Live orders goes Subject.
One of the user's Subject orders goes Live.
Someone inactivates a relationship with the user.
A relationship is confirmed with the user.
Treasury feed is down.

Described herein is a comprehensive and integrated system for the trading of financial instruments such as fixed income securities or other tradable properties which allows for desired participation of broker dealers and other intermediaries. The system's advantageous data structures and messaging systems as described herein support the real time operation of the system over the Internet, the execution of live orders, and the integration with other client systems.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method, comprising:
receiving a first order from a first ordering party at a computerized system, the first order including at least one bid or offer relating to financial instrument to permit execution of a serial chain of transactions pertaining to the financial instrument in the computerized system, based on the first order;

receiving one or more intermediate orders, including at least one offer or bid relating to said financial instrument, from at least one of a plurality of intermediate parties using the computerized system, at least one of the intermediate orders being placed by the at least one intermediate party in response to the first order;

receiving a second order, including at least one offer or bid relating to said financial instrument, from a second ordering party using the computerized system, the second order being placed by the second ordering party in response to one or more of the intermediate orders;

identifying the serial chain of transactions using the first order, at least one received intermediate order, and the second order;

executing the at least one transaction within the serial chain of transactions, where the serial chain of transactions comprises a transfer of said financial instrument between the first ordering party and a first intermediate party, and a transfer of said financial instrument between the second ordering party and a last intermediate party and where the first intermediate party and the last intermediate party are different parties or the same party.

2. The method of claim 1, comprising determining whether a match occurs between one of the intermediate orders and at least one of the first and second orders of the first and second ordering parties.

3. The method of claim 2, comprising matching one or more of the intermediate orders between the first order and the second order and executing the one or more matched orders to at least partially execute the serial chain of transactions.

4. The method of claim 3, comprising receiving an indication from the first ordering party to select whether the first order is a live, executable order or a subject order.

5. The method of claim 4, wherein the first order is a live, executable order, and the step of receiving one or more intermediate orders comprises receiving one or more live, executable intermediate orders.

6. The method of claim 5, comprising automatically executing one or more live orders in the serial chain of transactions that are matched.

7. The method of claim 1, wherein:
the first order received from the first ordering party is an order subject to satisfaction of a condition, and
the method further comprises executing the order subject to condition only if the condition is satisfied.

8. The method of claim 1, comprising storing a set of rules for each of at least some of the parties using the system in a memory accessible to such parties, wherein the step of receiving intermediate orders comprises receiving intermediate orders generated between intermediate parties based upon the stored sets of rules.

9. The method of claim 1, wherein the first order received from the first ordering party has a first set of terms, and the step of receiving intermediate orders comprises receiving intermediate orders having respective second sets of terms different than the first set of terms.

10. The method of claim 9, wherein the first set of terms include a price for one or more transactions in the serial chain of transactions, and the step of receiving intermediate orders includes receiving intermediate orders having respective second sets of terms in which a price term has been modified from the first set of terms.

11. The method of claim 1, wherein the step of identifying the serial chain of transactions comprises tracking a path of parties for which orders have been received tracing back to the first ordering party.

12. The method of claim 11, comprising storing a subset of the path of parties in association with each of the orders.

13. The method of claim 1, wherein at least one of the first, second, and intermediate orders have parameters set by at least one of the first, second, and intermediate parties, and the intermediate orders in the serial chain of transactions cannot be prevented from execution by parameters set by the first and second ordering parties.

14. The method of claim 1, wherein at least one further one of the intermediate orders participating in the serial chain of transactions is placed by at least one further intermediate party in response to one or more others of the intermediate orders.

15. The method of claim 1, wherein any further intermediate orders participating in the serial chain of transactions are placed by others of the intermediate parties in response to one or more others of the intermediate orders.

* * * * * tag

(12) INTER PARTES REEXAMINATION CERTIFICATE (0248th)
United States Patent
Hughes et al.

(10) Number: US 7,231,363 C1
(45) Certificate Issued: Mar. 8, 2011

(54) METHOD AND SYSTEM FOR REBROKERING ORDERS IN A TRADING SYSTEM

(75) Inventors: Webster Hughes, Charlotte, NC (US); Charles Fefferman, Princeton, NJ (US)

(73) Assignee: Wall Corporation, Greenwich, CT (US)

Reexamination Request:
No. 95/001,049, Jun. 3, 2008

Reexamination Certificate for:
Patent No.: 7,231,363
Issued: Jun. 12, 2007
Appl. No.: 09/706,678
Filed: Nov. 6, 2000

Related U.S. Application Data

(60) Provisional application No. 60/173,581, filed on Dec. 29, 1999, provisional application No. 60/178,049, filed on Jan. 24, 2000, and provisional application No. 60/201,599, filed on May 3, 2000.

(51) Int. Cl.
G06Q 40/00 (2006.01)

(52) U.S. Cl. .............................. 705/37; 705/26; 705/35
(58) Field of Classification Search .................... 705/37, 705/35, 26
See application file for complete search history.

(56) References Cited

U.S. PATENT DOCUMENTS

| | | | |
|---|---|---|---|
| 5,375,055 A | 12/1994 | Togher et al. | |
| 6,014,643 A | 1/2000 | Minton | |
| 6,405,180 B2 | 6/2002 | Tilfors et al. | |
| 6,408,282 B1 | 6/2002 | Buist | |
| 6,968,318 B1 | 11/2005 | Ferstenberg et al. | |
| 7,222,089 B2 | 5/2007 | Harpale | |
| 7,333,952 B1 | 2/2008 | Neyman et al. | |

OTHER PUBLICATIONS

Weiss, After the Trade Is Made: Processing Securities Transactions (1993) (Additional Excerpts).
The Communicator, Broker Booth Support System (Aug. 1997).
Wall Street Technology, "eCommerce in the U.S. Fixed Income Markets—The 1999 Review of Electronic Transcation Systems Nov. 1999," Aug. 17, 2000 URL: http://www.wallstreetandtech.com/showArticle.jhtml?articleID=14704373.
Marilyn Cohen, "Bond Trading Goes On–Line", Forbes (Jan. 25, 1999).

(Continued)

*Primary Examiner*—Matthew C. Graham

(57) ABSTRACT

Systems and methods are described herein for supporting the trading of bonds in a computerized system using broker dealers as intermediaries. Broker dealers receive orders relating to particular transactions and have the option to accept the order by submitting a matching counter order, or to rebroker the order with the same or modified terms to a number of other investors or additional broker dealers. The additional broker dealers have similar options, thus providing a system wherein orders can be quickly proliferated to a large number of parties. This order proliferation can be fully or partially automated through the use of predefined rules stored in a database which dictate for each broker dealer whether, to whom and under what terms to rebroker orders. When an order is received, the system processes all such rules to output a set of orders which are then communicated to the corresponding parties.

At the time of issuance and publication of this certificate, the patent remains subject to pending reissue application number 12/724,842 filed Mar. 16, 2010. The claim content of the patent may be subsequently revised if a reissue patent is issued from the reissue application.

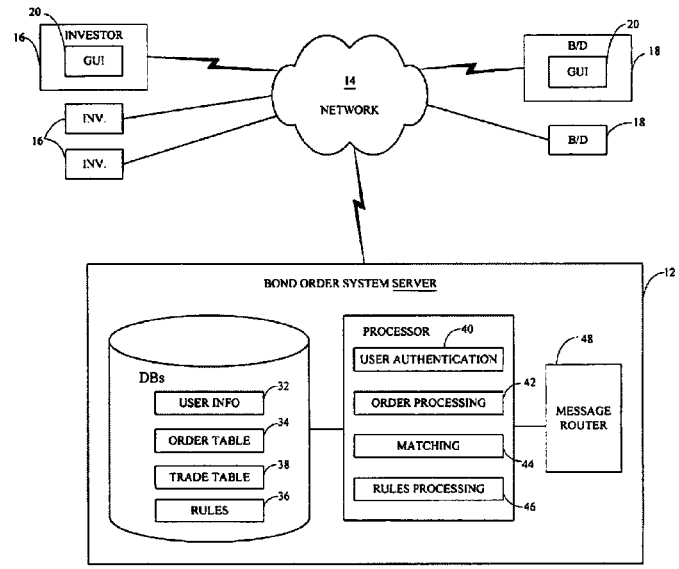

OTHER PUBLICATIONS

Toddi Gutner, "How to Seal a Great Bond Deal", BusinessWeek (May 24, 1999).

Bond Market Association, The 1998 Review of Electronic Transaction Systems in the U.S. Fixed Income Securities Markets (Nov. 1998).

Smith, Selway, and McCormick, The Nasdaq Stock Market: Historical Background and Current Operation, NASD Working Paper 98–01 (Aug. 24, 1998).

National Association of Securities Dealers, Notice to Members 86–67 (Oct. 2, 1986).

Financial Information eXchange Protocol, Version 4.1 (Mar. 31, 1998, with errata from Jun. 30, 1999).

U.S. General Accounting Office, U.S. Government Securities: An Examination of Views Expressed About Access to Brokers' Services, GAO/GGD–88–8 (Dec. 1987).

Weiss, After the Trade Is Made: Processing Securities Transactions (1993).

Bondexchange, Spear, Leeds & Kellogg—Fixed Income On Line Trading Manual (Apr. 1998).

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8, 9 and 13 are determined to be patentable as amended.

Claims 2-7, 10-12 and 14-15, dependent on an amended claim are determined to be patentable.

1. A method, comprising:
  receiving a first order from a first ordering party at a computerized system, the first order including at least one bid or offer relating to *a* financial instrument to permit execution of a serial chain of transactions pertaining to the financial instrument in the computerized system, based on the first order, *each transaction within the serial chain of transactions comprising a transfer of ownership of said financial instrument between two parties each acting as principals*;
  receiving one or more intermediate orders, including at least one offer or bid relating to said financial instrument, from at least one of a plurality of intermediate parties using the computerized system,
  at least one of the intermediate orders being placed by [the] at least one intermediate party in response to the first order, *the computerized system supporting intermediate orders placed in response to other intermediate orders; the intermediate party placing the intermediate order acquiring ownership of the financial instrument from the first ordering party*;
  receiving a second order, including at least one offer or bid relating to said financial instrument, from a second ordering party using the computerized system, the second order being placed by the second ordering party in response to one or more of the intermediate orders, *the second ordering party placing the second order acquiring ownership of the financial instrument from the intermediate party*;
  identifying the serial chain of transactions using the first order, at least one received intermediate order, and the second order;
  executing the at least one transaction within the serial chain of transactions, where the serial chain of transactions comprises a transfer of *ownership of* said financial instrument between the first ordering party and a first intermediate party, and a transfer of *ownership of* said financial instrument between the second ordering party and a last intermediate party and where the first intermediate party and the last intermediate party are different parties or the same party.

8. [The method of claim 1] *A method, comprising:*
  *receiving a first order from a first ordering party at a computerized system, the first order including at least one bid or offer relating to a financial instrument to permit execution of a serial chain of transactions pertaining to the financial instrument in the computerized system, based on the first order; each transaction within the serial chain of transactions comprising a transfer of ownership of said financial instrument between two parties each acting as principals,*
  *receiving one or more intermediate orders, including at least one offer or bid relating to said financial instrument, from at least one of a plurality of intermediate parties using the computerized system, at least one of the intermediate orders being placed by the at least one intermediate party in response to the first order; the intermediate party placing the intermediate order acquiring ownership of the financial instrument from the first ordering party,*
  *receiving a second order, including at least one offer or bid relating to said financial instrument, from a second ordering party using the computerized system, the second order being placed by the second ordering party in response to one or more of the intermediate orders; the second ordering party placing the second order acquiring ownership of the financial instrument from the intermediate party,*
  *identifying the serial chain of transactions using the first order, at least one received intermediate order, and the second order;*
  *executing the at least one transaction within the serial chain of transactions, where the serial chain of transactions comprises a transfer of ownership of said financial instrument between the first ordering party and a first intermediate party, and a transfer of ownership of said financial instrument between the second ordering party and a last intermediate party and where the first intermediate party and the last intermediate party are different parties or the same party; and*
  storing a set of rules for each of at least some of the parties using the system in a memory accessible to such parties, wherein the step of receiving intermediate orders comprises receiving intermediate orders generated between intermediate parties based upon the stored sets of rules.

9. [The method of claim 1] *A method, comprising:*
  *receiving a first order from a first ordering party at a computerized system, the first order including at least one bid or offer relating to a financial instrument to permit execution of a serial chain of transactions pertaining to the financial instrument in the computerized system, based on the first order; each transaction within the serial chain of transactions comprising a transfer of ownership of said financial instrument between two parties each acting as principals,*
  *receiving one or more intermediate orders, including at least one offer or bid relating to said financial instrument, from at least one of a plurality of intermediate parties using the computerized system, at least one of the intermediate orders being placed by the at least one intermediate party in response to the first order; the intermediate party placing the intermediate order acquiring ownership of the financial instrument from the first ordering party,*
  *receiving a second order, including at least one offer or bid relating to said financial instrument, from a second ordering party using the computerized system, the second order being placed by the second ordering party in* response to one or more of the intermediate orders; the second ordering party placing the second order acquiring ownership of the financial instrument from the intermediate party,

*identifying the serial chain of transactions using the first order, at least one received intermediate order, and the second order; and*

*executing the at least one transaction within the serial chain of transactions, where the serial chain of transactions comprises a transfer of ownership of said financial instrument between the first ordering party and a first intermediate party, and a transfer of ownership of said financial instrument between the second ordering party and a last intermediate party and where the first intermediate party and the last intermediate party are different parties or the same party;* wherein the first order received from the first ordering party has a first set of terms, and the step of receiving intermediate orders comprises receiving intermediate orders having respective second sets of terms different than the first set of terms.

13. The method of claim 1, wherein at least one of the first, second, and intermediate orders have parameters set by at least one of the first, second, and intermediate parties, and the intermediate orders in the serial chain of transactions cannot be prevented from execution by parameters set by the first and second ordering [parties] *counter-parties*.

* * * * *